US012442297B2

(12) United States Patent
Vagata et al.

(10) Patent No.: US 12,442,297 B2
(45) Date of Patent: Oct. 14, 2025

(54) SEAFLOOR HARVESTING WITH AUTONOMOUS DRONE SWARMS

(71) Applicants: Alessandro Vagata, Sugar Land, TX (US); Guilherme A. Brechbuhler De Pinho, São Paulo (BR); Luis Antonio De Lima, São Paulo (BR)

(72) Inventors: Alessandro Vagata, Sugar Land, TX (US); Guilherme A. Brechbuhler De Pinho, São Paulo (BR); Luis Antonio De Lima, São Paulo (BR)

( * ) Notice: Subject to any disclaimer, the term of this patent is extended or adjusted under 35 U.S.C. 154(b) by 924 days.

(21) Appl. No.: 17/521,572

(22) Filed: Nov. 8, 2021

(65) Prior Publication Data

US 2022/0145756 A1 May 12, 2022

Related U.S. Application Data

(60) Provisional application No. 63/111,458, filed on Nov. 9, 2020.

(51) Int. Cl.

| | |
|---|---|
| ***E21C 50/02*** | (2006.01) |
| ***E02F 3/88*** | (2006.01) |
| ***E02F 3/90*** | (2006.01) |
| ***E02F 7/00*** | (2006.01) |
| ***G08G 3/00*** | (2006.01) |
| *B63G 8/00* | (2006.01) |

(52) U.S. Cl.

CPC ............ *E21C 50/02* (2013.01); *E02F 3/8866* (2013.01); *E02F 3/907* (2013.01); *E02F 7/005* (2013.01); *G08G 3/00* (2013.01); *B63G 2008/002* (2013.01)

(58) Field of Classification Search

CPC ........ B63G 2008/004; B63G 2008/002; B63G 8/001; E21C 50/00; E21C 50/02; E02F 7/04; E02F 9/026; E02F 7/005; E02F 3/885; E02F 3/8866; E02F 3/907; G08G 3/00

USPC ............................................... 701/21; 37/313

See application file for complete search history.

(56) References Cited

U.S. PATENT DOCUMENTS

| | | | | |
|---|---|---|---|---|
| 3,955,294 | A * | 5/1976 | Morgenstein | E02F 3/144 299/9 |
| 4,231,171 | A * | 11/1980 | Balligand | E21C 50/02 114/313 |
| 4,280,288 | A | 7/1981 | Corfa | |
| 4,343,098 | A * | 8/1982 | Balligand | B63B 35/40 114/313 |
| 8,794,710 | B2 | 8/2014 | Howard | |
| 8,935,864 | B2 | 1/2015 | Halkyard | |
| 9,309,642 | B2 * | 4/2016 | Patriciu | E02F 3/92 |
| 9,874,000 | B2 | 1/2018 | Heiler | |
| 10,428,653 | B2 | 10/2019 | Parianos | |
| 10,458,235 | B2 * | 10/2019 | Halkyard | E02F 7/023 |

(Continued)

OTHER PUBLICATIONS

Pliant, Ocean Mining: Time to Swarm the Deep?, Ocean Science & Technology, Aug. 2020, p. 26.

*Primary Examiner* — Christopher J Sebesta
*Assistant Examiner* — Blake E Scoville
(74) *Attorney, Agent, or Firm* — Taylor Dykema, PLLC

(57) ABSTRACT

The present invention provides a system, apparatus, and method for harvesting objects from the bottom of aquatic environments. The invention preferably provides a system, apparatus, and method for utilizing swarms of autonomous harvesting vehicles to harvest polymetallic nodules from the ocean floor.

1 Claim, 13 Drawing Sheets

(56) References Cited

U.S. PATENT DOCUMENTS

| | | | | |
|---|---|---|---|---|
| 10,480,317 | B2 | 11/2019 | Zhao | |
| 2013/0306524 | A1* | 11/2013 | Welch | B03B 11/00 114/313 |
| 2020/0165795 | A1* | 5/2020 | Chang | E21C 50/00 |

* cited by examiner

SEAFLOOR HARVESTING WITH AUTONOMOUS DRONE SWARMS

CLAIM OF PRIORITY AND CROSS REFERENCE TO RELATED DOCUMENTS

The present application claims the benefit of and priority to U.S. Provisional Patent Application No. 63/111,458, filed Nov. 9, 2020, entitled "SEAFLOOR HARVESTING WITH AUTONOMOUS DRONE SWARMS" by Alessandro Vagata, et al. The disclosure of this Provisional Patent Application is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD OF THE INVENTION

The present invention relates, generally, to the field of retrieval of underwater objects. More specifically, the present invention relates to apparatus, system, and methods harvest nodules from the ocean floor. One of ordinary skill in the art, however, will recognize that the present invention could also be utilized for retrieving a variety of other objects from any underwater environment.

BACKGROUND OF THE INVENTION

In recent years, the push to use sustainable energy sources to build a low carbon economy has gained substantial momentum. Companies and public are increasingly showing a preference for "green" or renewable forms of energy and the pursuit of decarbonization will be a likely global trend for the foreseeable future.

The energy and transportation industries are among the largest carbon producers. Technology development in those fields will be essential to reaching decarbonization goals. The transport sector contributes approximately 20% of global greenhouse gasses, and emissions from transportation grow at a faster rate than any other sector. Decarbonizing the transportation is a critical part of global efforts to reduce emissions. Batteries are an essential component of this effort.

The World Bank predicts that demand for battery metals will rise elevenfold by 2050. Shortages for base metals used in batteries, such as nickel, cobalt and copper, are predicted to emerge by 2025.

One way to address projected shortages is to look to the deep ocean for renewable energy solutions to meet growing resource demands. Large mineral deposits found on the sea floor are creating exciting challenges and opportunities to further develop a sustainable future. The mineral deposits of interest here consist of polymetallic nodules.

Roughly the size of a potato, polymetallic nodules are formed over millions of years on the seabed. Polymetallic nodules cover vast areas of the seafloor. They form through the aggregation of layers of iron and manganese hydroxides, and range in size from a few millimeters to tens of centimeters. Composition of the nodules, In addition to manganese and iron, these nodules contain nickel, copper, and cobalt in commercially attractive concentrations, as well as traces of other valuable metals such as molybdenum, zirconium and rare earths. These are the same metals that are used in electric vehicle batteries.

The polymetallic nodules found in the Clarion Clipperton Fracture Zone in the Pacific Ocean contain more nickel, manganese, and cobalt than all terrestrial reserves combined. The Clarion Clipperton Fracture Zone is estimated to contain 21 billion tons of polymetallic nodules, enough to electrify the entire global fleet of vehicle several times.

SUMMARY OF THE INVENTION

The present invention describes an innovative approach to the collection of polymetallic nodules. This approach is based on harvesting with swarms of autonomous drones.

In the approach of the present invention, the drones—also referred to Autonomous Harvesting Vehicles ("AHV")—may permanently reside on the seafloor to collect the nodules. This arrangement optimizes productivity while minimizing environmental disturbance.

The drones are supported by Automated Underwater Vehicles ("AUV") for mapping and surveying, by communication and power hubs, and by structures for uploading the harvested material. These components are connected through a subsea communication network. A Support Vessel on the surface provides the Mission Control Center for the operations, assures technical support for the equipment, and the transfer of the material to bulk vessels.

The present invention provides a lean, fail-safe approach that provides for maximum uptime with minimum capital investment. Specific operational algorithms and requirements for components of the present invention can be derived from equipment in the areas of artificially intelligent machines, ultra-deep water oilfield operations, and deep sea mining.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification and the invention. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking may be advantageous. Moreover, the separation of various components in the embodiments described above should not be understood as requiring such separation in all embodiments, and it should be understood that the described components can generally be integrated together in a single product.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts.

The specific embodiments discussed herein are merely illustrative of specific ways to make and use the invention and do not limit the scope of the invention.

Figure 1:
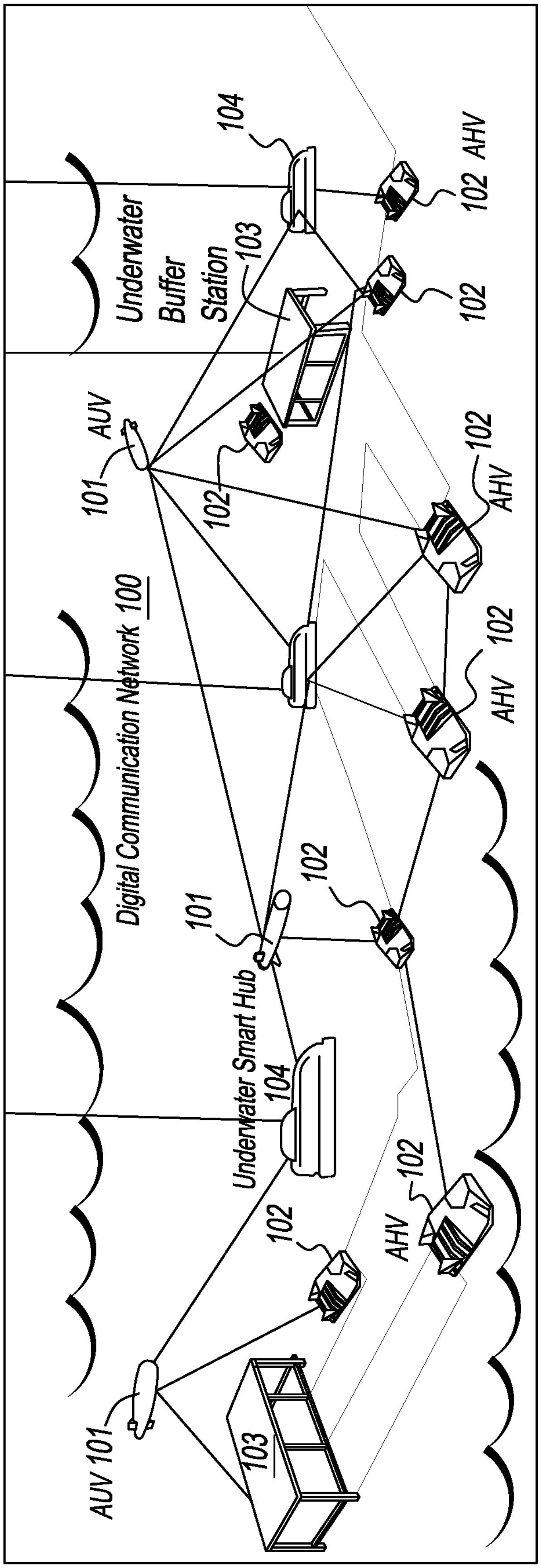
FIG. 1 is a conceptual illustration of an embodiment of the deployment of the major components of the system.

For illustrative purposes, the relative size of components and the relative distances between components are not depicted to scale in FIGS. 1 through 14. Referring now to FIG. 1, one embodiment of the present invention is provided as an illustrative example.

FIG. 1 is a conceptual illustration of an embodiment of the deployment of the major components of the system of the present invention. The preferred embodiment of the present invention provides swarms of Autonomous Harvesting Vehicles ("AHV") 102 supported on the seabed by Underwater Smart Hubs ("USH") 104, and Automated Underwater Vehicles ("AUV") 101. A Digital Underwater Communication Network 100 insures the link between the subsea vehicles, and the Surface Mission Control Center. Underwater Buffer Stations ("UBS") 103 collect the material prior to the transfer on the surface. The Support Vessel hosts the Mission Control Center, assures technical support for the equipment and the transfer of the material to bulk vessels.

The system of the present invention is modular and is deployed on a mineral exploration area. The number of each component deployed can be adjusted as necessary to adapt to the exploration area and the related desired harvesting productivity.

The function of the AHVs 102 is to 'skim' the seabed to collect polymetallic nodules and transport them to the UBSs 103 for the recovery to the surface.

In the preferred embodiment, the AHVs 102 operate as a swarm. The AHVs 102 are guided by internal sensors, a network-shared digital 3D-GIS map, and artificial intelligence ("AI") to optimize their navigation path and collecting strategy. Ideally, the AHVs 102 have the capability to navigate autonomously in a radius up to 10 miles from the USHs 104, based on an acoustic digital communication network, a 3D digital map of the seabed, and inputs from surrounding components.

The sensors, digital maps, and AI described herein are well-known in the art. One of ordinary skill in the art will appreciate how to selection appropriate systems for the desired application. One of ordinary skill in the art would also understand that embodiments described herein can be used with swarms consisting of as few as one AHV 102 and can be scaled up to virtually any number AHVs 102 with an upper limit dependent on the limitations of the selected hardware. One of ordinary skill in the art would further appreciate that the description of the present invention is draft to describe the harvesting of nodules from the ocean floor, but the system can be easily adopted to other desired objections from virtually any aquatic environment.

In the preferred embodiment of the invention, the AHV 102 is an autonomous, battery powered vehicle. When the battery level reaches a minimum threshold, it docks on the USH 104 to either swap the battery or to dock and plug-in to recharge. The choice of recharging strategy is determined by the mission progress of the swarm and the specific characteristics of the mission.

In the preferred embodiment of the invention, the USH 104 is provided with docking stations for the AHVs 102 and interfaces for feeding/recharging batteries, downloading/uploading data, missions, logs. It also stores replacement batteries for the AHVs 102. The USH 104 is connected with the surface to insure power and communications. The units are equipped with a bank of high-capacity battery modules to guarantee power continuity.

Features of major components of the preferred embodiment of the system of the present invention are as follows:

The Underwater Smart Hub ("USH") 104 is a power and communication hub. It is constantly connected either physically or through remote communications with all the components deployed in the field. It uploads and downloads data and protocols, checks integrity and tests the AHV 102, collects environmental data, up-streams the data collected. The USH 104 resides on the seabed to support AHV 102 operations. The USH 104 is substantially permanently connected to the surface for power and surface communication. In the preferred embodiment, the connection is via an umbilical 203 that includes fiber optic links. The surface section of the USH 104 is a Support Drone Barge ("SDB") 201, based on a deck barge architecture, with power generation and propulsion capabilities. Each USH 104 can host and recharge a number of AHVs 102. The USH 104 is equipped with battery chargers on each of the docking stations and also quick connecting spare battery packs for the AHVs 102.

In the preferred embodiment, each USH 104 has a tethered light ROV used for AHV 102 inspection, maintenance, and repair. The USH 104 is deployed and relocated by the SDB 201. Each USH 104 is connected with Control Communication Center 202 for diagnostic, positioning, data and missions upload/download. The Control Communication Center may also be referred to as a "Surface Mission Controller" or "Surface Mission Control Center." The USH 104 is equipped with on-board sensors to monitor the underwater scenario. In the preferred embodiment, the USH 104 is designed for months of autonomous operations, and the SDB 201 intervenes only for routine maintenance.

In the preferred embodiment, the USH 104 operates according to a number of operational principles. The USH 104 is stationary around the mission target points. When it is being repositioned, the USH 104 is lifted by a winch 204 on the SDB 201 to clear the seabed and is guided to the working area in a specified target section in the seabed. The positioning and landing of the USH 102 on the seabed may be assisted by a support ROV.

Figure 10:
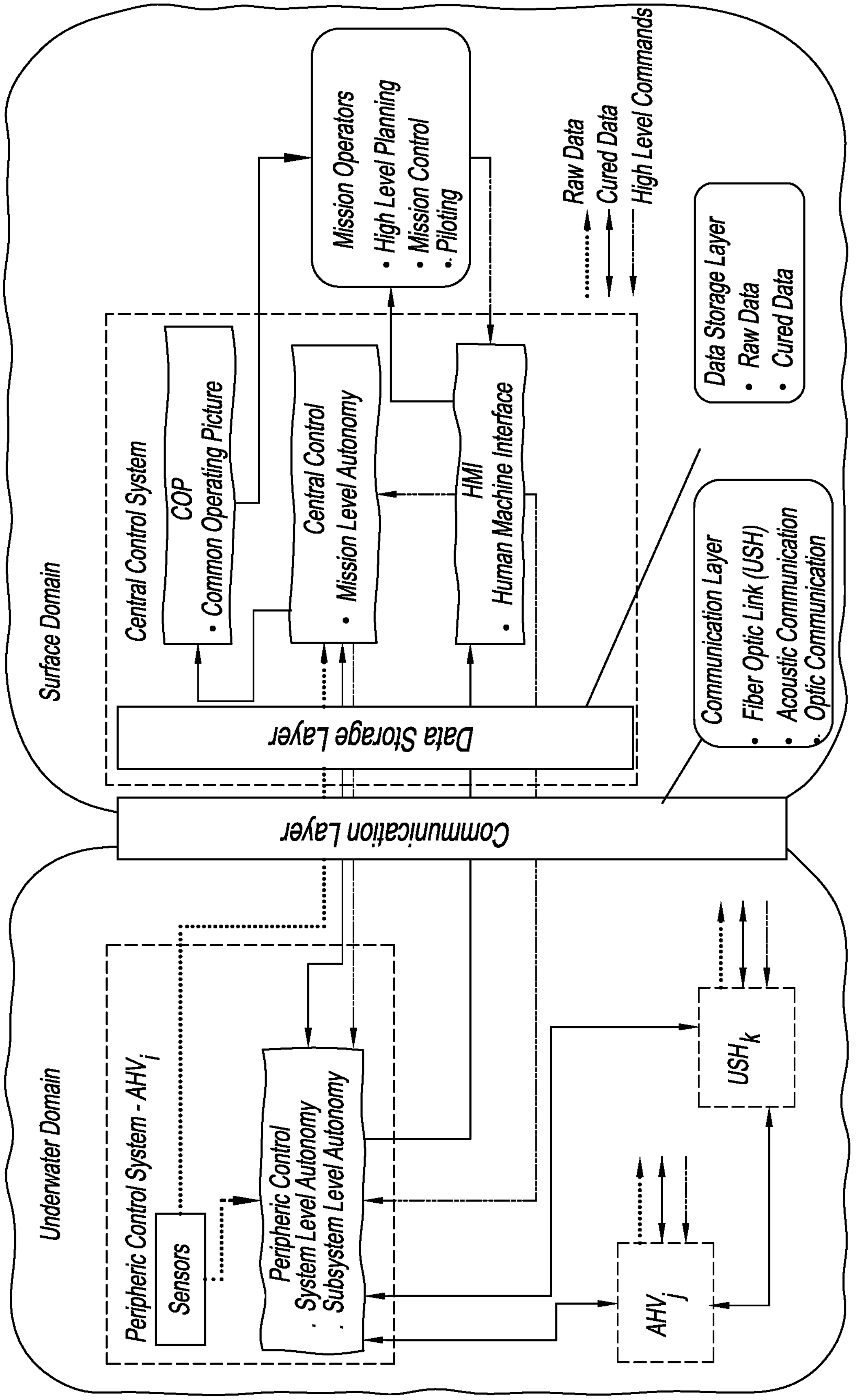
FIG. 10 is a schematic diagram of an embodiment of the communication and data processing systems of the invention.

As illustrated in FIG. 10, in the preferred embodiment, the USH Peripheric Control System is connected to the Central Control System that coordinates the missions, uploads and downloads data and protocols, performs diagnostic, checks integrity, and tests the host units, collects environmental data, and upstreams the data collected. The control system is redundant and fault tolerant.

USHs 104 are substantially constantly connected with the Mission Control Center on the Support Vessel for diagnostic, positioning, data and missions upload/download.

The USH 104 is preferably designed for several months of autonomous operations without maintenance. A Support Vessel ROV can intervene for unplanned maintenance and inspections. Maintenance and inspection requirements will be affected by the effects of bio-fouling, corrosion and other environmental factors on components at operational depths for the desired mission durations.

In the preferred embodiment, the USH 104 is able to run daily status and/or maintenance diagnostic checks for each AHV 102. The check generates a log that is transmitted to Mission Control onshore.

The USH 104 is equipped with high capacity batteries. The batteries on the USH 104 are used as continuity backup for the control computers and for all the USH 104 sensors.

Figure 2:
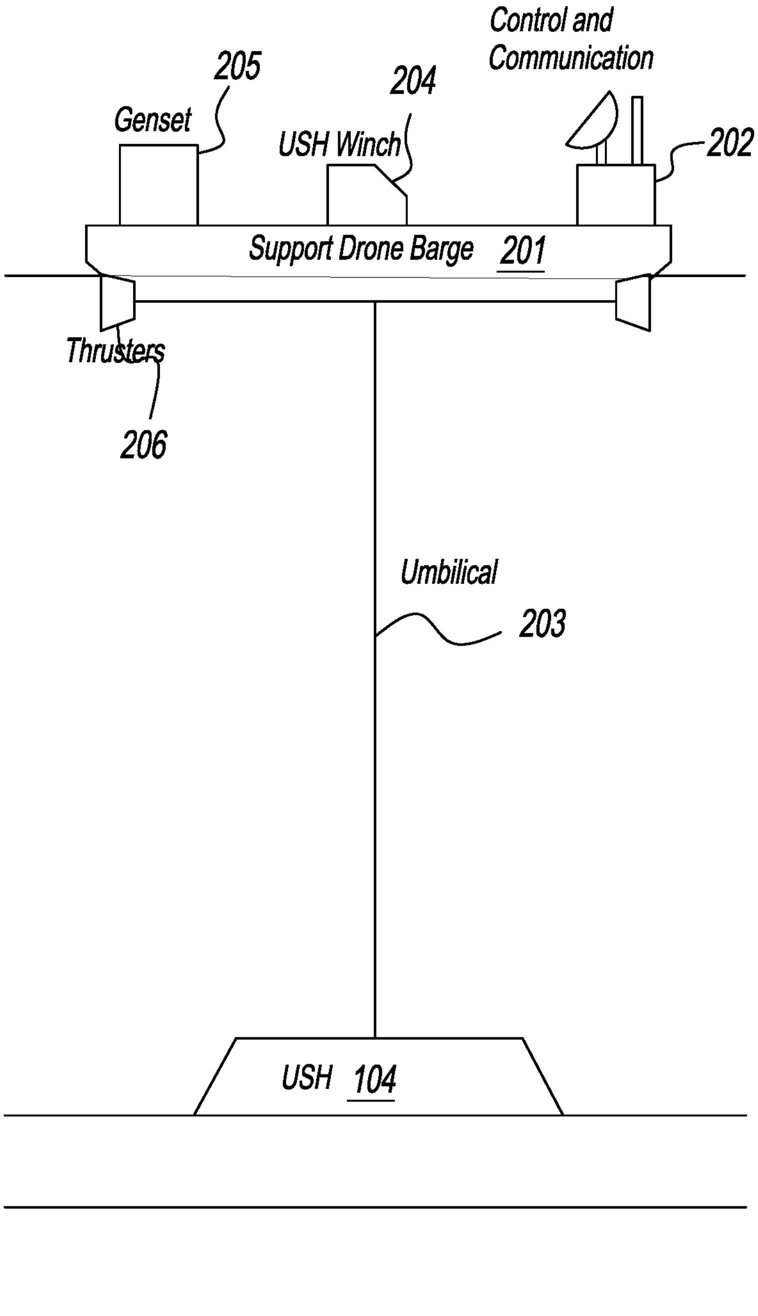
FIG. 2 is an illustration of an embodiment of connection of the underwater components to a surface ship.

Referring now to FIG. 2, one embodiment of the present invention is as an illustrative environment. FIG. 2 is an illustration of an embodiment of connection of the underwater components to a surface ship. Specifically, the Support Drone Barge ("SDB") 201 is connected to the USH 104 through an umbilical 203. The SDB 201 provides power, communications, high-bandwidth wi-fi and satellite communications for the system.

SDB 201 architecture is well-known in the art. In the preferred embodiment, the SDB 201 is based on an Ocean Class Barge equipped with 4 Electrical Thrusters 206 for DP1 Dynamic Positioning. One example of an appropriate SDB 201 is the McDonough Ocean Class Barge.

The SDB is sized according to the needs of the mission. For purposes of illustration only, the McDonough Ocean Class Barge measures 140'×40'×9.6' with a load capacity at the load-line of 1330 ton. Said barge is equipped with two 400 kW Diesel Power Generators, one 600 square meter solar panel array, an AHC electrical winch 204 for the USH 104, a Control Communication Center 202, a Diesel Fuel Tank, and four 94 kW electrical thrusters 206. Power generation equipment 205, also known as a "Genset," may be installed on the Support Drone Barge 201 to generate power onsite for transmission to USH and to power other activities on the support drone barge. Genset may comprise diesel, gasoline, natural gas or other fossil fuel generator; or other power generation technology that may be now known or hereafter invented.

Figure 3:
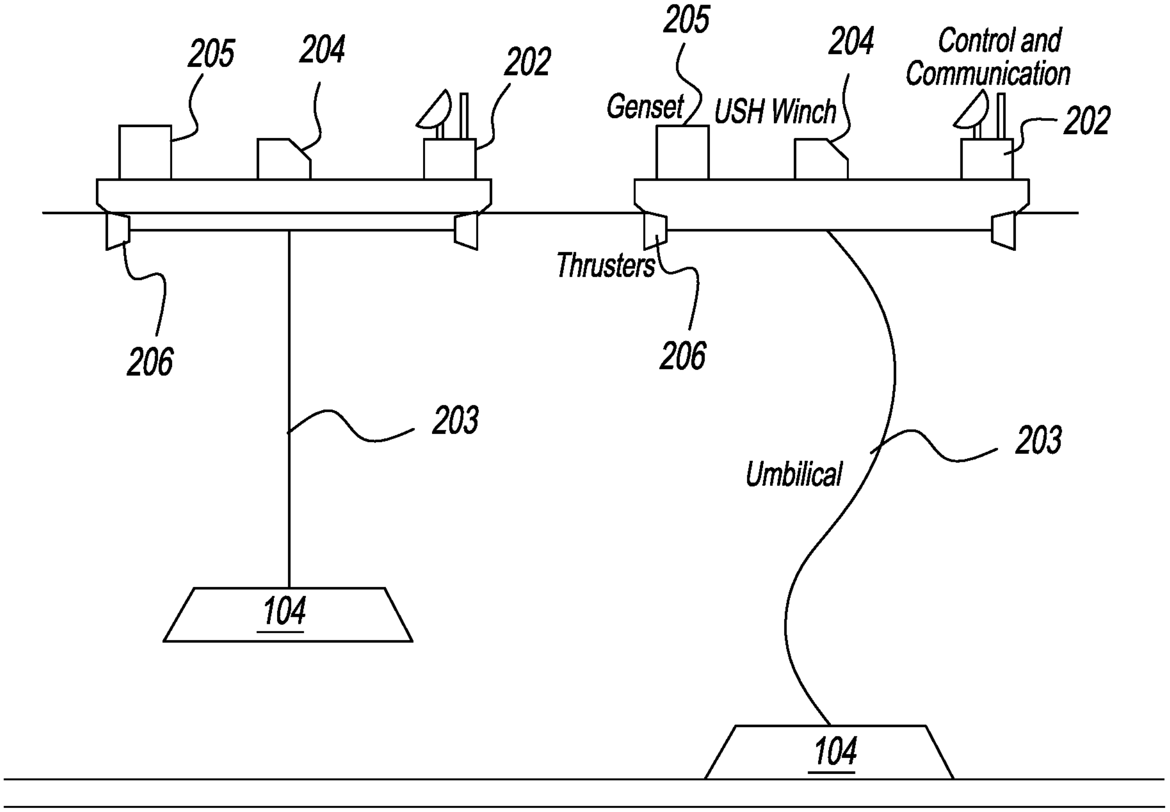
FIG. 3 is an illustration of an embodiment of the components of FIG. 2 in different stages of deployment.

In the preferred embodiment, the SDB 201 uses the winch 204 for USH 104 repositioning. For illustrative purposes, this can be done by lifting the USH 104 approximately 100 ft above the seabed and moving it to a new position. FIG. 3 illustrates the configuration of the SDB 201 and USH 104 during repositioning in the left illustration and during operations in the right illustration. For long transfer or USH 102 recovery, the SDB 201 can pull the USH 102 close under the hull.

As with the other components, the winch 204 is well-known in the art. For illustrative purposes only, one example of a high capacity winch with 2 m/s speed is the Hawboldt, MacArtney winch.

Power generation and consumption is also a consideration. For illustrative purposes only, the power needed for the USH 104 and SDB 201 during continuing operations can be approximated as follows: AHV Batter Charge, power 200 kW, energy consumption 4800 kWh; dynamic position, power 55 kW, energy consumption 1320 kWh; communications/controls, power 5 kW, energy consumption 120 kWh. For a total power of 260 kW and total energy consumption of 120 kWh.

In addition, the winch 201 may be approximated to require 600 kW during lifting operations.

In the preferred embodiment, power is provided by a combination of conventional and clean sources that guarantee continuous generations and backup. For illustrative purposes only, two 400 kW Cat C13 diesel generator sets are installed on the exemplary SDB 201 described above. Utilizing these components, one generator operating at 65% capacity is able to provide the power needed for the operations.

In the preferred embodiment, a 600 square meter solar array is displaced on the SDB 201 deck to provide a renewable source of energy. For illustrative purposes only, the solar radiation in the Clarion/Clipperton Zone area is significant with a yearly average of 200-225 W/m2. Based on a 20% efficiency of the solar array, the solar array can be expected to produce an average of 30 kW.

In an additional embodiment, the USH 104 can also be powered using power buoys providing approximately 250 kW power generation. Again, this technology is well-known in the art. One example is the Corepowers WEC—Wave Energy Converters—point absorber type, with a heaving buoy on the surface absorbing energy from ocean waves. The buoy is connected to the seabed using a tensioned mooring system. In this system, the device oscillates in resonance with the incoming waves, strongly amplifying the motion and power capture.

The illustrative example described above offers five times more energy per ton of device compared to previously known power buoy technologies. This allows for a large amount of energy to be harvested using a relatively small and low-cost device, reducing equipment cost per kW capacity. Power Buoys are compact and easy to install and maintain; thus reducing operational costs. The desirability of such systems with depend on the conditions at the mission location.

In the preferred embodiment, the Autonomous Harvesting Vehicle ("AHV") 102 is designed to 'skim' the seabed to collect polymetallic nodules. The AHV 102 is ideally designed to operate in autonomous mode, during which it approaches the target area, harvests the desired nodules, downloads the harvested payload, and connects to the USH 104 when needed.

Figure 4:
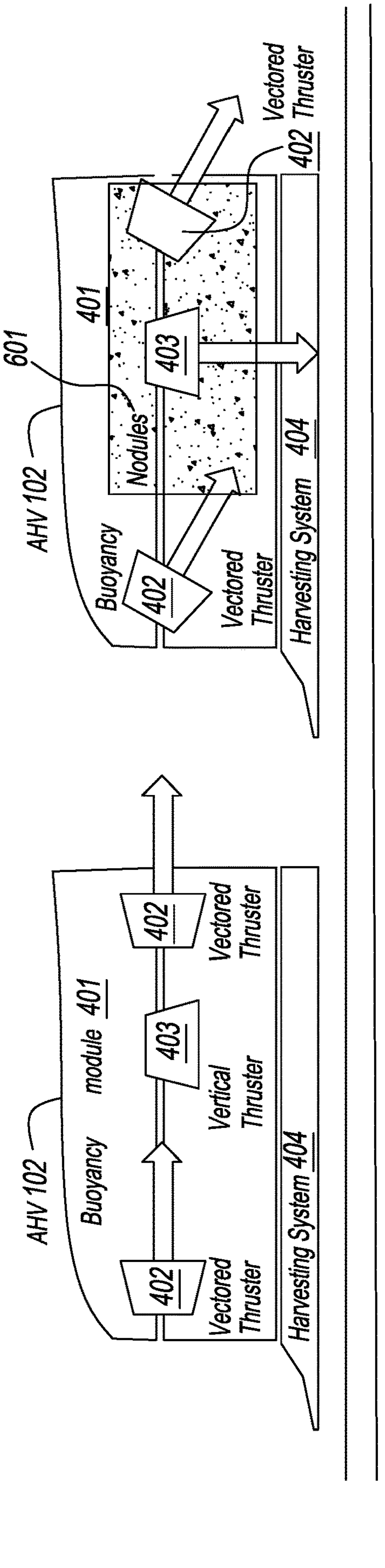
FIG. 4 is an illustration of an embodiment of the autonomous harvesting vehicle ("AHV") showing a first method of maintaining buoyancy as the AHV experiences increased load during operations.

Referring now to FIG. 4, one embodiment of the AHV 102 of the present invention is shown as an illustrative environment. FIG. 4 is a cross-sectional side view of the AHV 102 of the preferred embodiment. The AHV 102 contains a harvesting system 404, which harvests the desired materials from the sea floor.

Figure 6:
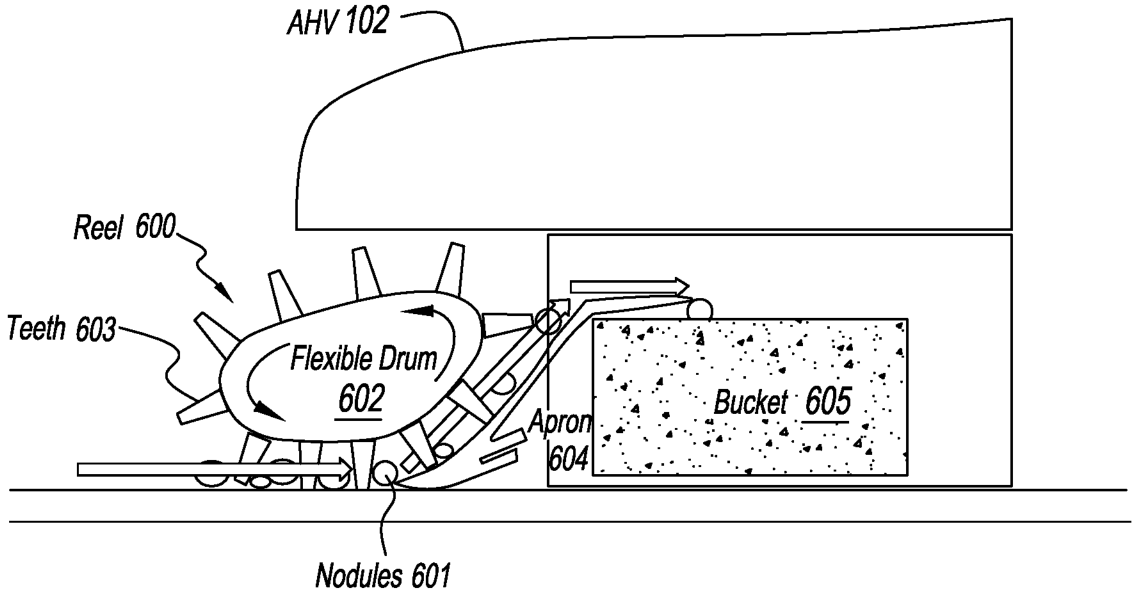
FIG. 6 is an illustration of an embodiment of the major components of a first configuration of the harvesting system of the AHV.

Referring now to FIG. 6, one embodiment of the harvesting system 404 of the AHV 102 of the present invention is shown as an illustrative environment. FIG. 6 is a cross-sectional side view of the harvesting system 404 of the AHV 102 of the preferred embodiment. Ideally, the harvesting system 404 of the AHV 102 is designed with a few moving parts, the harvesting system 404 is intended to 'sweep' the nodules 601 into the apron 604 using minimal power consumption. Preferably, the harvesting system 404 including a bucket 605 for capturing the harvested nodules 601. In the preferred embodiment, the bucket 605 holds approximately one cubic meter of payload.

The AHV 102 is designed to have minimal interference with the marine life.

Referring back to FIG. 4, the AHV 102 of the preferred embodiment includes buoyancy modules 401. In the preferred embodiment, said buoyancy modules 401 are configured to maintain the vehicle, without a payload, neutral in the aquatic environment in which is being utilized. In the preferred embodiment, vectorized thrusters provide additional lift and allow for fast transfer speed to enhance productivity. When empty, the behavior of the AHV 102 is similar to a standard AUV and requires minimal power (approximately 25 kW) to reach transfer speeds of up to 5 Kts (<400 Kg of horizontal thrust).

Because the preferred embodiment is designed to be buoyancy neutral, the system requires the ability to compensate for the weight of the payload of the harvested product.

In the preferred embodiment, during harvesting, the AHV 102 deploys two sets of sleds 801 to maintain a constant altitude from the seabed and rotates the vectored thrusters 402 to compensate for the weight of the nodules. At the end of the harvesting, the sleds 801 are recovered and the AHV 102 compensates for the weight of the nodules substantially exclusively with vertical thrust, while insuring enough horizontal thrust to navigate with enough speed to transfer to the storage station. In this embodiment, approximately 1000 Kg of thrust is required for the hoovering, and approximately 300 kg of thrust is required for navigation at a speed of approximately 3 Kts.

Figure 5:
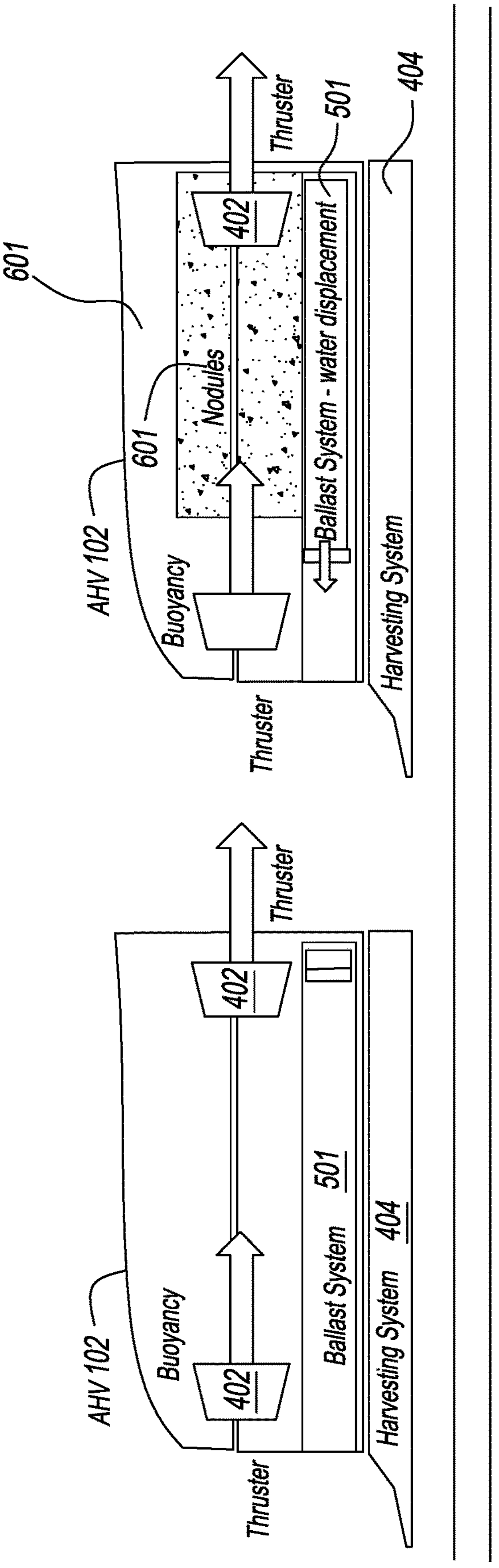
FIG. 5 is an illustration of an embodiment of the AHV showing a second method of maintaining buoyancy as the AHV experiences increased load during operations.

Referring now to FIG. 5, an additional embodiment of the buoyancy system of the AHV 102 of the present invention is shown as an illustrative environment. FIG. 5 is a cross-sectional side view of the buoyancy system of the AHV 102 of this additional embodiment. In this embodiment, the AHV 102 includes a variable ballast system 501 that maintains the AHV 102 substantially neutral in any condition. The variable ballast system 501 is configured to compensate the weight of harvest nodules 601. In this embodiment, the harvest nodules weigh approximately 1000 kg when the bucket 605 is fully loaded. Compensating for this load requires the displacement of approximately 1 cubic meter of water from the ballast system 501. By way of illustration, the required displacement system can be achieved using two 2 meter long 500 millimeter OD cylinders.

Additional features of the AHV 102 in the preferred embodiment include small size, hydrodynamic design, and a profile that allows for low drag and low power consumption.

In the preferred embodiment, advanced lithium batteries are utilized and allow for approximately six hours of operation, depending on the mission parameters. In the preferred embodiment, interchangeable batteries are available on the USH 104 to quickly reconfigure the AHV 102 for uptime maximization.

Such underwater vehicles are well-known in the art. In the preferred embodiment, the AHV 102 has the size of a compact work class ROV (100 kW class). The AHV 102 can cover a wide range of in-field missions, merging the autonomous capabilities of an AUV with the intervention capabilities of a pilot operated ROV.

In the preferred embodiment, the AHV 102 has three modes of operation: Fully Autonomous Mode, Supervision Mode and Fully Controlled Mode.

In Autonomous Mode the AHV 102 operates based on the predetermined mission tasks and internal sensor inputs. This is the primary mode for the harvesting. A supervisor can access status information and logs at any time, but no direct intervention is required except when an anomaly is detected. In Supervision Mode a remote operator can intervene on the mission through high-level commands. In Fully Controlled Mode, only in proximity of the USH 104 or a subsea wi-fi hot spot, the AHV 102 can be controlled in real time by an operator as a standard ROV, mainly for ordinary maintenance, battery replacement, and visual inspection tasks.

In the preferred embodiment, operation the AHV 102 is enabled by the Digital Underwater Communication Network 100 that links AHVs 102, AUVs 101, USHs 104, UBS 103, and the Communication and/or Surface Mission Control Center 202. The Network 100 is based on complementary wireless technologies which serve under different conditions and at different stages. Acoustic Communication is used for long range navigation, tracking, positioning and diagnostic, and also for high level mission inputs when the AHV 102 operate in Autonomous and Supervision Mode. For other activities that require intense supervisor inputs, high-rate communication equipment is installed within the field to allow the remote operator to provide real-time command and control to the vehicle, essentially flying it like a traditional tethered ROV. High bandwidth subsea wireless communication may include RF, EM and Optical (LED or Laser), or other protocols understood by one of ordinary skill in the art.

In Full Control Mode, AHV 102 have the ability to switch seamlessly between different wireless communication environments and bandwidths depending on the strength and availability of the signals. The software should provide a method for negotiating and reconciling the system activities with regard to the way it communicates with the human supervisors. Such communications methods are well-known in the art.

In the preferred embodiment, during Autonomous Mode the AHV 102 primary missions include: point-to-point navigation from the USH 104 to the target mission point; mineral harvesting on an assigned track; point-to-point navigation from the target mission point of the harvesting area to the UBS 103 to upload the material. Secondary missions of the AHV may include survey capabilities, such as harvesting monitoring, oceanographic surveys (salinity, density), and environmental monitoring.

Digital GIS 3D map and the coordinates of the target points are downloaded in the AHV 102 navigation control system, where the base missions for the AHV 102 units are also defined and preplanned. The global scenario is updated constantly via the Digital Communication Network 100, so every AHV 102 is notified on the status of the harvesting and on the missions and position of the other AHVs 102 to avoid interferences and optimize the harvesting process.

Internal sensors and mission awareness AI algorithms adapt the mission to the actual conditions. Examples include but are not limited to: obstacles on the route, marine life safeguard, interference with other AHVs 102, system auto-diagnostics warnings.

Upon returning to the USH 104 after completing a full duty cycle, AHV 102 will upload the data (video, 3D models, sensors data etc.) that can be automatically sent to Mission Control.

In the preferred embodiment, each AHV 102 is equipped with an Inertial Motion Unit ("IMU") and with a complete suite of navigation sensors that support its autonomous navigation. Onboard Inertial Navigation System ("INS") is supported by Acoustic Positioning System, Auto-Target Recognition, Tracking systems, Laser, Obstacle Avoidance sonar.

Supervision Mode gives the operator the chance to monitor the mission status and modify the mission with high level commands if necessary. Communication is performed through the low bandwidth acoustic link. In supervision mode for example the operator has the possibility to modify the route of the AHV 102 to avoid possible conflicts with other assets, or has the possibility to reassign the harvesting area, or put the AHV 102 in stand-by mode.

In the preferred embodiment, when the AHV 102 is in proximity of an USH 104 and UBS 103, or a Communication Node equipped with high bandwidth wireless system, it can be operated manually as an ROV, with the operator onshore having full control mode.

AHV 102 is equipped with HD Ethernet Cameras for streaming video to allow the operator to receive images with virtually no latency (less than 100 m sec). The control system will transmit also real time telemetry of the system, including navigation information and diagnostic for the full control of the AHV 102.

In the preferred embodiment, in Full Control Mode the AHV 102 can be equipped with interchangeable task-specific tool skids stored on the USH 104. The skids can be readily changed for rapid turn-around between dives requiring different tooling packages. AHV 102 features an automatic docking system for the skids.

In the preferred embodiment, in ROV mode the AHV 102 can perform a full range of operations, including inspections (e.g., visual inspection of harvested material, inspection and diagnostics on other AHVs 102 or USH 104), light intervention (e.g. water jetting and cleaning the harvesting devices if needed, manipulator tasks on other AHVs 102 and USH 104, light maintenance on the harvesting Infrastructures), and real time video streaming.

In the preferred embodiment, the size of the AHV 102 allows for a payload in excess of 1000 kg. For illustrative purposes, such a vehicle could be expected to require 100-120 kW of power. Advanced lithium batteries allow for a target endurance of about six hours, depending on the mission parameters. AHV 102 size and profile are preferrably minimized to allow for low drag and low power consumption. One of ordinary skill in the art would understand that drag is greatly contained also by an efficient hydrodynamic design. Preferably, interchangeable payloads and interchangeable batteries are available on the USH 104 to reconfigure the AHV 102.

In the preferred embodiment, the AHV 102 is an autonomous underwater vehicle designed and optimized around the mission to 'skim' the seabed to collect up to one cubic meter of polymetallic nodules and transport them in the most efficient and reliable way and with minimal interference with the marine life.

The main systems of the AHV architecture are: propulsion, power pack, harvesting, buoyancy, main structure, control system, and mission management.

In the preferred embodiment, the propulsion system is based on six electric thrusters. Four of the thrusters are vectored to allow for a horizontal/vertical redistribution of the thrust depending on the mission profile, and two vertical thrusters are fixed to compensate the weight of the harvested nodules. Thrusters sized for the AHV 102 are commercially available and well-understood in the art. By way of illustration only, commercially available suitable thrusters include: Tecnadyne 8020, Innerspace 1002H, and Copenhagen Subsea VXL.

In the preferred embodiment, the power pack is designed to provide about 100 kWh of energy to the AHV 102. This size is comparable with the battery packs used today in the automotive industry and provides a good compromise between mission duration, recharge time/interval, and size. The energy consumption is based on the typical mission profile for the AHV 102. For illustrative purposes only, based on a typical mission profile, a daily energy consumption of 490 kWh is expected for each AHV 102. Utilizing 100 kWh battery packs, four recharges or battery swaps would be required daily to supply the above daily energy consumption.

In the preferred embodiment, the battery pack is pressure tolerant. The battery is made of pressure tolerant encapsulated components. Pressure tolerant batteries typically use lithium-polymer cells that are encapsulated by a silicone polymer that remains flexible, yet stable under pressure. This method of encapsulation allows to reduce the size and weight of traditional subsea battery packs by not requiring the cells to be located inside pressure housings or flooded with oil. As such, the battery design is no longer constrained by dimensions of the pressure or oil housings. They can now be contoured to better fit the shape of the vehicle, which improves packing efficiency and increases volumetric density. Such batteries are well-known in the art and are commercially available from sources such as Kraken Robotics, SWE, and ISE, each of which already produce subsea batteries depth rated.

In the preferred embodiment, the pressure tolerant battery systems are modular and can be connected in banks to meet voltage and capacity requirements.

In an alternative embodiment, the power system may be a hybrid system supported by a fuel cell stack. Fuel cell power systems have been identified as an effective means to increase endurance but no implementation in a commercial device has yet been realized. Fuel cells would allow the system to generate constant power while the peaks would be managed with the battery. Factors to consider in implementing this alternative embodiment include weight, size, costs, subsea production and recharging infrastructure for hydrogen and oxygen.

The harvesting system 404 is the core of the AHV 102. In the preferred embodiment, the main functionalities of the harvesting system 404 are to skim the seabed with a rack-type tool to collect the nodules 601, a gathering system to load the basket 605 in the AHV 102, and a system to displace marine life.

The harvesting system 404 should be refined and optimized during shallow water trials that will allow the user to select the optimal system and tune it to desired operational parameters.

Key points for the design of the harvesting system include: minimal frictional drag for the AHV 102 during collection, high collection speed, high collection efficiency, minimal environmental impact; and low power consumption. One of ordinary skill in the art will appreciate that many types of systems will meet these design requirements, depending on the material to be collected and the environment in which the system is to operate. Two of the most straightforward embodiments are a mechanical system or a hydraulic system.

In the preferred embodiment, a mechanical system is used. Referring now to FIG. 6, one mechanical system embodiment of the harvesting system 404 of the AHV 102 of the present invention is shown as an illustrative environment. FIG. 6 is a cross-sectional side view of the harvesting system 404 of the AHV 102 of the preferred embodiment utilizing a mechanical system. The harvesting system 404 is built with few moving parts to increase reliability. The design is similar to the rock-pickers used in agriculture.

In this embodiment, a drum 602 moves the reel 600 to perform the picking action. The drum 602 is preferably flexible. The guided reel 600 contains teeth 603, which travel parallel to the seabed pulling the nodules toward the apron. During this phase the teeth 603 are guided not more than 30-40 mm below the seabed. The teeth 603 lift the nodules 601 onto the apron 604 following the same contour of the apron 604. The apron 604 is a rack with narrow spacing to allow the discharge of unwanted seabed material or marine life while retaining the desired nodules 601 to be deposited in the bucket 605.

Based on analogies with existing agricultural machines, the speed of the AHV 102 during the harvesting with this system should be in the order of 0.5 Kts or 0.25 m/s. At this speed, the AHV 102 would require two minutes to cover 30 meters that, on average, contains one cubic meter of material.

Because the distribution of the polymetallic nodules is on the seabed surface, rather than buried, the apron 604 does not require the ability to plough seabed, but only need to skim it. Furthermore, the teeth 603 sweep the nodules 601 parallel to the seabed. The teeth 603 should not have a downward action, because a downward action may push or bury some of the nodules 601. These factors combine to decrease drag of the AHV 102.

Figure 7:
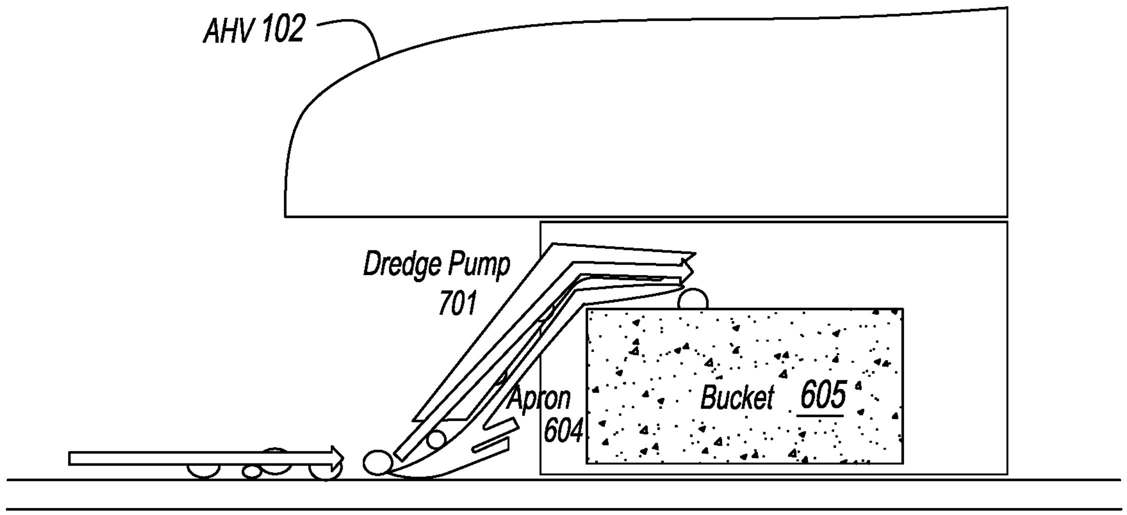
FIG. 7 is an illustration of an embodiment of the major components of a second configuration of the harvesting system of the AHV.

In an alternative embodiment, a venturi or hydraulic system is used. Referring now to FIG. 7, one venturi system embodiment of the harvesting system 404 of the AHV 102 of the present invention is shown as an illustrative environment. FIG. 7 is a cross-sectional side view of the harvesting system 404 of the AHV 102 of the preferred embodiment utilizing a venturi system. The venturi-based option for the harvesting system 404 uses dredge pumps 701 instead of mechanic reels 600 and teeth 603. The venturi effect created by the dredge pump 701 generates a vacuum at the inlet that pulls the nodules 601 in the apron 604 and to the bucket 605.

There are several pumps well known in the art and commercially available. One example is the Vertex 4" electric pump, which provides a removal rate of approximately 50 ton/hr while using approximately 6 kW. The number and placement of the dredge pumps 701 will depending upon the mission parameters.

When implementing the alternative venturi system embodiment, the user should consider that the dredging effect can displace a significant plume of material, which can result in both environmental and operational impacts. Operation impacts include interference with the acoustic and optical systems due to the local variation of the density of the sea-water and the compromised visibility. These impacts can effect systems including positioning, communications, sonar, laser fluorosensing, cameras, and optical-wireless communications. The determination of whether to implement this system should depend on the sedimentation time of the debris material and the mitigation techniques that can be put in place.

During harvesting, it is critically important to dynamically balance the AHV 102 to maintain the correct attitude. The AHV 102 should maintain: constant liftoff from the seabed to allow an optimal 'skim' position of the apron; constant attitude, pitch and roll during the harvesting; and constant forward speed.

In the preferred embodiment, constant attitude is maintained by supporting the thrusters 402 and 403 (or thrusters 402 and 403 and ballast system 501, depending on the selected embodiment) with two actuated sleds 801 that are deployed during the harvesting phase. The sleds 801 will simplify the control of the AHV 102.

Thrusters 402 and 403 and ballast 501 will balance the majority of the AHV 102 weight during the harvesting, the sleds 801 will only compensate the offset. The required size of the sleds 801 will be determined based on the bearing capacity of the soil and the load to be compensated. Dimensions of the sleds 801 is further determined by the load that they should carry and the soil strength. The calculations to determine appropriate sled size are well known in the art.

The sleds 801 can be retractable or fixed.

As described above, in the preferred embodiment, the AHV 102 has neutral or slightly negative buoyancy in water.

Buoyancy modules 401 are well known in the art. In a preferred embodiment, the buoyancy module 401 is made from syntactic foam blocks finished with polyurethane skin. The buoyancy modules 401 are shaped to be hydrodynamic and contain apertures for sensors and the main system lift point. Such modules are commercially available, including low density BMTI-HP6000-33.1 Syntactic Foam with 530 $kg/m^3$ density.

As described above, a variable ballast can in be included in one embodiment to allow additional buoyance to compensate for the weight of the harvested material.

In a preferred embodiment, the AHV 102 chassis is made of aluminum and polypropylene. Materials and design are balanced to create a lightweight chassis, maximizing strength and stiffness to support the various systems of the AHV 102.

In the preferred embodiment, the Control System includes sensors and control architecture for navigation, harvesting, and communications.

The AHV 102 fully autonomous navigation uses internal inertial navigation supported by the acoustic positioning system. Digital maps and the coordinates of the target points are downloaded in the AHV 102 navigation control system.

The core of the navigation system is the navigation computer interfaced to the sensors from the AHV 102, including but not limited to Inertial Navigation System (INS), Doppler Velocity Log (DVL), Depth Sensor, Altimeter and heading sensor. These systems produce 3D angular rates and accelerations that are mathematically integrated into orientation, velocity and position.

The navigation computer receives the aiding positions (latitude and longitude) from the acoustic positioning (SSBL, USBL, LBL or other) and combines them with the inertial data to produce the best possible output. The final result is the position and speed vector of the AHV 102 in the 3D digital environment.

This information is used to autonomously guide the AHV 102 in the planned mission. Support sensors give to the AHV 102 environment awareness, including obstacle avoidance, and target identification that the navigation computer uses to determine the final route.

When the AHV 102 is in Full Control Mode in proximity of a USH 104 or a Wireless node, the AHV 102 can be piloted as an ROV, under FC mode and also in Semi-Autonomous mode the operator can give commands to the autopilot functions. Autopilot functions include: auto heading, auto depth, auto pitch/auto roll and stabilization, auto altitude, and full DP capabilities.

During the harvesting phase it is critical to maintain the attitude of the AHV 102. The AHV 102 should maintain a constant altitude above seabed so that the harvesting system 404 can work in the optimal conditions. The attitude of the AHV 102 in this stage is controlled by the thrusters 402 and 403 and the sleds 801.

In the preferred embodiment, the attitude variation of the AHV 102 is detected by altimeters that measure the height of the AHV 102 above seabed. Load cells measure the weight of the material loaded on the AHV 102.

The combination of inputs from altimeters and load cells is uploaded on the navigation control to adjust the thruster 402 and 403 speed and the position of the sleds 801 as needed.

To assess the environmental impact of the operations, in particular the size and density of the plume generated by the harvesting, in the preferred embodiment, a turbidity sensor is installed on the AHV 102.

Effective communication during all the different phases of the missions of the AHV 102 is essential.

In the preferred embodiment, the AHVs 102 are in continuous communication with the USHs 104 and the other AHVs 102 in the area.

In the preferred embodiment, the AHVs 102 communicate through two primary wireless systems, acoustic and optic.

The acoustic system is dedicated to send and receive cured information with the minimum amount of bandwidth. Cured information includes text strings with basic commands, positioning, alarms/warnings, system diagnostics.

The optic system is instead dedicated to send and receive large amounts of data such as video streaming, photographs, and sonar data. In addition, this system is used in proximity of a high-bandwidth hub as the operator takes control.

In the preferred embodiment, the AUVs 101 support harvesting operations providing preliminary exploration, mapping, and post-harvesting assessment. The extremely high resolution of the sensors on the AUV 101 platforms allows a very accurate definition of the seabed in the area of exploration.

Upon returning to the USH 104 or to the SDB 201 after completing a cycle, the AUVs 101 upload the data (sensors data, videos, images, etc.) that are automatically sent to the Mission Control Center computers.

The digital GIS 3D maps generated are uploaded in the central control system, and in the AHV 102 and AUV 101 peripheric control systems, where the base missions are defined and preplanned. The global scenario is updated constantly via the Digital Communication Network 100, so every device is notified.

In the preferred embodiment, the primary missions of the AUV 101 are: high resolution 3D seafloor mapping and imaging; and exploration and environmental assessment. Secondary missions of the AUVs 101 include: harvesting monitoring; geophysical site inspection; oceanographic surveys (salinity, density, temperature); and environmental monitoring.

In the preferred embodiment, this scope of the seafloor mapping is to provide a 3D map for the GIS platform used for the navigation of the AHVs 102 and AUV 101 and for the Common Operating Picture (described below). The AUV 101 are equipped with mapping sonars that operate simultaneously during the mission: 3D synthetic aperture sonars (SAS), and a sub-bottom profiler. The synthetic aperture sonars produce high-resolution mapping at high area coverage, and the subbottom profiler penetrates sediments on the seafloor, allowing the detection of layers within the sediments. The AUVs 101 are launched on programmed missions and run on their own battery power until they return to the USH 104 or the SDB 201, as programmed, for recovery.

An important task for the AUV 101 is the localization of the nodules, the identification of the high density area for the harvesting. And, after the harvesting, the assessment of the operations and the status of the seabed.

The other aspect is the environmental assessment of the species and of the marine habitat and the monitoring of the benthic communities impacted by the harvesting.

For this task, in the preferred embodiment, the AUVs 101 are equipped with a hyperspectral imager. The imager uses spectroscopy to analyze data from the light reflected from the seafloor, the technology detects and classifies objects and organisms of interest. Hyperspectral brings machine vision in the ocean space. The data are processed and used to identify, inspect, and map the features of interest. The results are reported on the digital 3D GIS map.

Deeper marine environments cannot be imaged by conventional hyperspectral imagers because the lack of sunlight. So a close-range, sunlight-independent hyperspectral survey approach is needed. Such systems are commercially available. For example, Ecotone AS has developed a hyperspectral imager for deep ocean applications. With this system, hyperspectral data are recorded for 112 spectral bands between 378 nm and 805 nm, with a high spectral (4 nm) and spatial resolution (1 mm per image pixel).

In the preferred embodiment, at least one underwater buffer station ("UBS") 103 resides on the seabed to support the AHV 102 operations. The UBS 103 is a special container where the AHVs 102 upload the harvested material before the transfer to the surface. In the preferred embodiment, the UBS 103 is connected to a buoy for recovery. The UBS 103 is deployed and relocated by the SDB 201. In one embodiment, the UBS 103 has a 250 ton capacity.

In the preferred embodiment, the Multipurpose Support Vessel ("MSV") resides in the area of operations and performs different functions. Primarily it hosts the Mission Control Center ("MCC"). All the data from the subsea equipment are collected and relayed in the MCC. Operators have the possibility to analyze and control harvesting productivity and parameters, status of the equipment, plan the exploration and of the subsequent areas. The MSV has onboard personnel and equipment to perform any type of maintenance and repair to the subsea equipment. MSV is equipped with 2 WROW for subsea intervention. The MSV is preferably equipped with deck cranes for handling the UBS 103 with the material, and to recover all the subsea equipment.

In the preferred embodiment, the Bulk Carrier transfers the material from the extraction area to the onshore processing facility. The Bulk carrier is equipped with deck cranes for handling the UBS 103 with the material.

In the preferred embodiment, the harvesting operations are performed autonomously by swarms of AHV 102 supported on the seabed by USH 103, AUVs 101, and ROVs. The Digital Communication Network 100 insures the link between the subsea assets and the surface MCC hosted by the MSV.

Autonomous drone swarm technology is one of the main innovative points of the present invention and has the potential to revolutionize the dynamics of underwater operations.

The system is driven heavily by data exchanges from the different assets and requires a dedicated common control infrastructure. A clear identification between autonomous operations, supervised operations and the command/control modalities and hierarchy is mandatory in this complex environment.

The core of the system is the Mission Management Architecture that integrates seamlessly manned and autonomous operations to create a coordinated and targeted process.

The key features of the Mission Management Architecture further described in this Section are the following:

1. Autonomous Swarm Operations. The mission of the AHVs 102 to harvest the seabed to collect polymetallic nodules 601 is an autonomous operation. The AHVs 102 have the ability to autonomously make decisions based on shared information and high level planning inputs.
2. Command and Control. The human operators in the Understand-Decide-Assess loop are able to make high level plans for the missions, provide guidance and optimization when needed, and control the execution.
3. Network Centric Intelligence. A key component of the structure is a common and shared data layer that exists across all systems. The system is able to govern and manage data sharing. It process and curate the amount of data to provide only essential information that the operators are able to manage at any one-time. Data curation and autonomy is integral for handling the large data sets and presenting concise information to the operator for rapid decision-making.
4. Infrastructures. Servers located onboard the MSV and onshore provide the links for the network computational infrastructure for the Mission Management system.

In the preferred embodiment, the harvesting of the nodules 601 by the swarm of AHVs 102 is an autonomous operation.

Autonomy in this context is the ability of the systems to achieve goals while operating independently of external control. The AHVs 102 in the preferred embodiment have the ability to autonomously make decisions based on the high-level planning tasks assigned by the human operator, the shared information, and their ability to manage unexpected events.

Autonomy is a requirement because the quantity and frequency of decision-making exceeds communication constraints and the capacity of a limited number of human operators to manage the scenario. Also time-critical decisions can be better made using rich on-board data compared to limited downlinked data, improving robustness and reducing complexity of system architecture and communication.

After the upfront investment, autonomous decision-making reduces dramatically system costs, and the cost of the overall operations.

In the preferred embodiment, the AHVs 102 perform autonomous tasks in the Mission, System and Subsystem Levels. Mission Level is related to operations that enable the swarm to collectively perform distributed activities. System Level is related to the AHV operativity itself and Subsystem Level is related to the components operativity of the AHV.

While the Mission Level Autonomy is performed at the central control level in the Mission Control Center computers of the preferred embodiment, System and Subsystem Level autonomy is peripheric and delocalized in the AHV 102 control computer.

Figure 11:
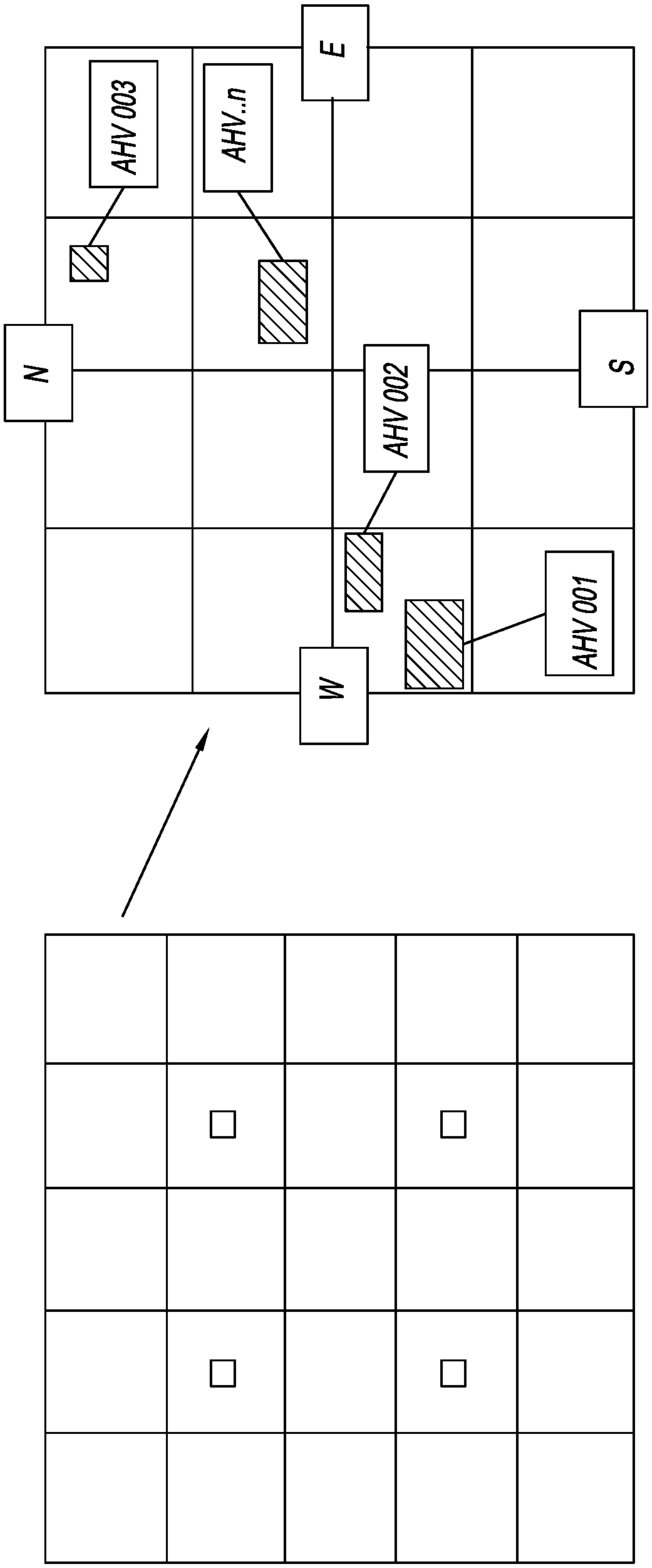
FIG. 11 is a conceptual illustration of an embodiment of the mapping and harvesting scheme of the invention.
Figure 12:
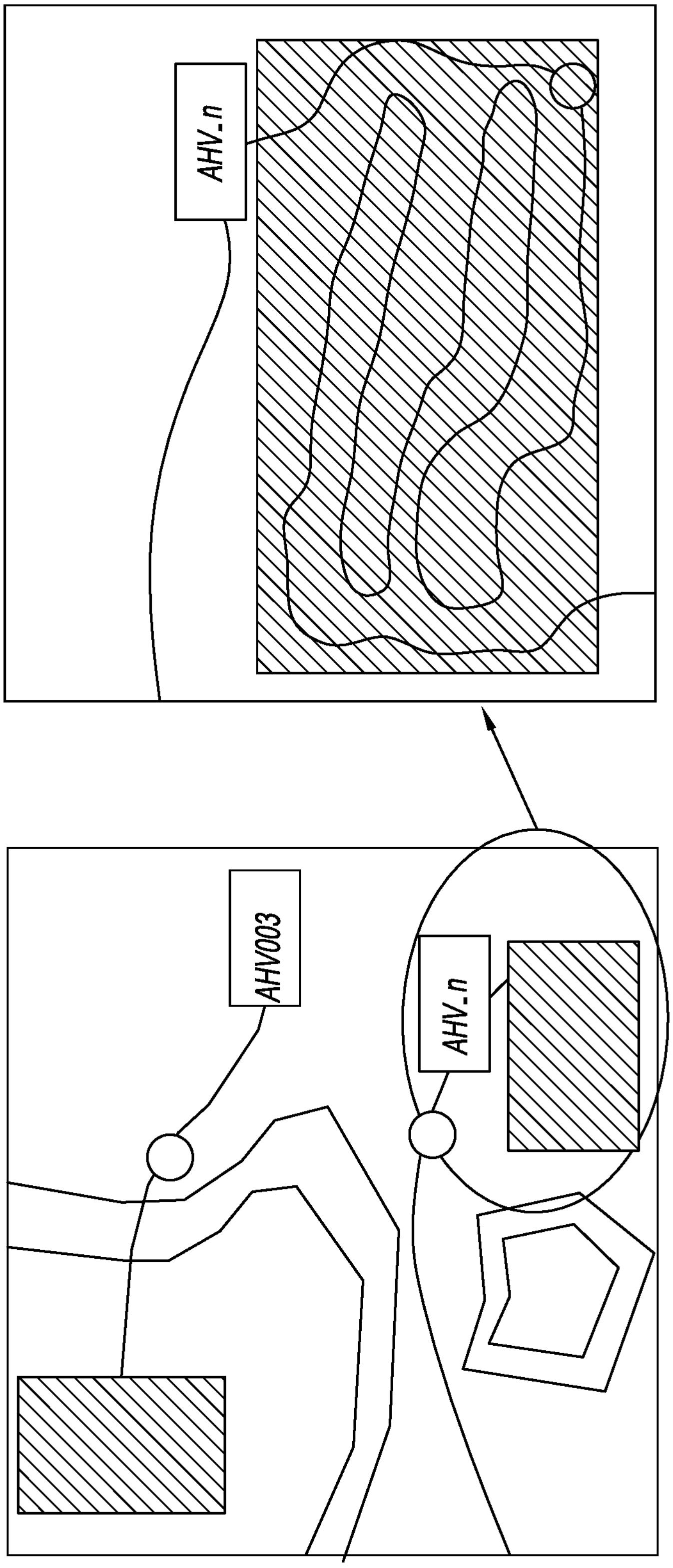
FIG. 12 is another conceptual illustration of an embodiment of the mapping and harvesting scheme of the invention.
Figure 13:
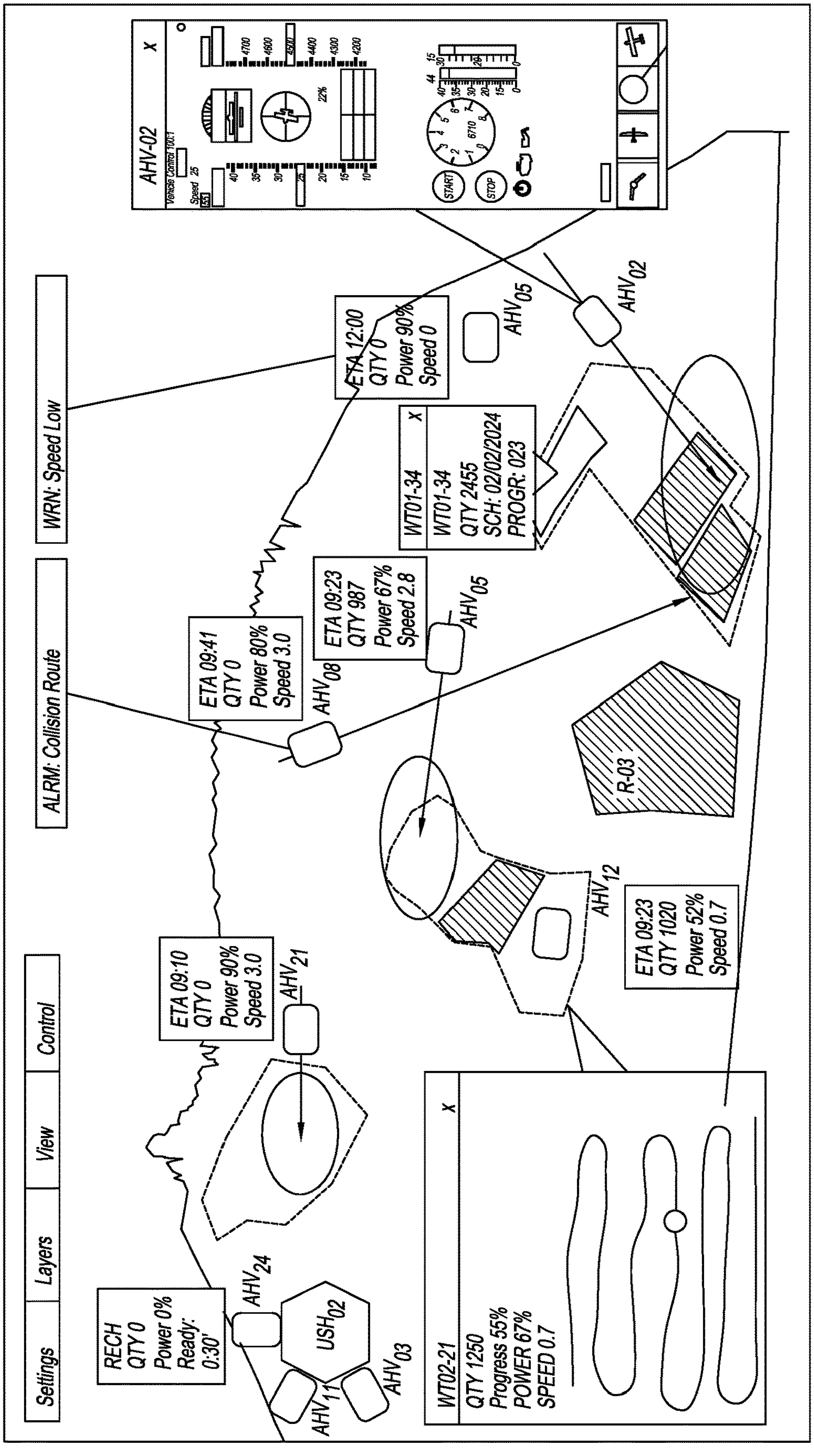
FIG. 13 is an illustration an embodiment of the command and control display of the invention.

The different type of autonomous and supervised tasks are illustrated by FIGS. 11 and 12.

Referring now to FIG. 11, in the left diagram of FIG. 11, the human operator based on the harvesting master plan assigns the Basic Cell for the harvesting. In the right diagram of FIG. 11, The Central Control system, based on the position and vital parameters of the AHVs 102, position of the USH 104, and other criteria like collision and jam avoidance, assigns to the single AHVs 102 the target areas for harvesting within the Basic Cell.

Referring now to FIG. 12, in the left diagram of FIG. 12, the Peripheric System of the AHV 102 after receiving the target area coordinates, and based on the 3D map and onboard sensor inputs, elaborates the optimal navigation path to the assigned target area. In the right diagram of FIG. 12, The Peripheric System of the AHV plan the harvesting pattern inside the target area.

In the preferred embodiment, there are four categories of autonomy embedded in the central and peripheric control architecture that insure the operativity of the AHVs 102: Situational and Self Awareness, Reasoning and Acting, Collaboration and Interaction, and Integrity. These categories are well known by those of ordinary skill in the art.

Examples of Situation and Self-Awareness for the AHV 102 include but are not limited to: spatial self-location in the 3D map, obstacle perception, knowledge of the position and behavior of other AHVs 102, assessment of the harvesting area for confirming presence and density of nodules, estimation of nodules availability, system performance assessment, estimation of presence of marine life, assessment of plume generated.

Examples of Reasoning and Acting include: Navigation and Harvesting Paths planning, Harvesting planning based on the size and pattern of the nodules, selecting the best USH 104 based on occupancy of other AHVs 102 and battery charge, re-planning the harvesting based on the progress of the other systems.

Examples of Collaboration and Interaction include: Inter AHV 102 communication of critical mission data, knowledge of the harvesting progress of the other AHVs 102, collaboration to support other AHV 102 due to changed/unexpected conditions in the seafloor (for example different nodules quantity), task negotiation with other AHV 102 based on the progress of the harvesting, behavior and intent prediction and interaction during navigation for collision/jam avoidance, re-plan docking/uploading/navigation based on unexpected circumstances from other AHV 102, interaction with the human operator for supervision and guidance when needed.

Examples of Integrity include: self-diagnosis and evaluation of the AHV 102 vital parameters, validation and go, no-go decision based on self-checks, harvesting and navigation performance evaluation.

Enabling technologies that are essential to realize AHV 102 autonomy include radio and hydroacoustic communication, embedded computer systems, communication networks, sensors and instruments, human-machine interaction, cognitive science, power electronics and electric drives.

In the preferred embodiment, the harvesting operations are performed autonomously by the AHV 102. But the human-system interaction is a key point of the system. The human operators are decision-makers of the Understand-Decide-Verify loop and at any time are able to make high-level plans for the missions, provide guidance and optimization when needed, and control the execution.

In this scenario, it is critical to ensure the operators are not overloaded with raw data and have only the necessary information for a rapid decision-making. The architecture insures that autonomous systems assist human operators with handling the load of information and alert human controllers to situations they must address.

In the preferred embodiment, the human operator is involved at three control levels:

- Mission planner level: It is the main high level task. Here the main mission objective is defined and the mission is planned. Subject to contingency handling, any input from the AHV 102, data analysis and any other input from the autonomy layer, the mission may be re-planned. As an example the Mission planning level consists of selecting the Basic Cell for the harvesting and assign the number of AHV 102 for the mission. Monitoring of the outputs, specifically the quantity of the mineral harvested and the remaining estimated deposit, is part of this level.
- Guidance and optimization level: Based on different inputs from the scenario, the Operator has the possibility to override and take control of the units with high level commands to re-plan the mission, change waypoints, stop the units.
- Control execution level: at this level the operator can take full control of the unit.

The element that integrates seamlessly manned and autonomous operations and creates a coordinate and targeted process is the Network Centric Intelligence. The control architecture that connects and shares the data layers that exists across all systems.

The Network Centric Intelligence is based on four building blocks: Hardware, Intelligence, Process and Situational Representation.

The Hardware includes all the interconnected vehicles and systems that operate in the field: AHVs 102, USHs 104, AUVs 101, the sensors, and the control systems. All the devices are being combined with a communication network to create smart connected devices that operate in the field. It is the Internet of Things ("IoT") tailored for the Underwater Harvesting Mission. This structure utilizes sensing to do situational awareness and reasoning and pushes more intelligence down to these devices to achieve intelligent reasoning and processing at the 'edges' of the network.

Since real time situational understanding is heavily dependent on high quality, timely data, IoT provides the means of capturing and providing that data in a way that would be never possible with conventional topside operated systems. As more data, and higher quality data is made instantly available, new types of reasoning can be performed to gain new awareness and better control.

In the preferred embodiment, the goal is to move much of the data processing as close to the point of capture as possible. Moving cognitive computing technologies onto IoT devices as the AHVs 102 allows the device to produce information, rather than just data. Information has the advantages of being more compact that data, reducing downstream processing time and effort, and empower smart dissemination to where the information is needed. This means more timely and precise delivery. The target is to embed as much intelligence as possible on these systems, and to form a computation network working in concert with high level nodes.

The harvesting operations benefits from systems with intelligent behavior that perceive its environment and make, or recommend, actions that maximize its chances of success and the overall productivity. Artificial Intelligence ("AI") concepts, such as reasoning, knowledge, planning, learning and communication, are all brought together in the Network Centric Intelligence structure.

AI in this context is about making the devices including AHV 102, AUV 104, USH 101, more capable of behaving in an intelligent manner and utilizing all the power of a computer to process massive amounts of data, function optimally full time, and never makes mistakes like happen in other contexts with human operators subject to stress and fatigue. As a decision support system, planners and operators want to have as much intelligence as possible to help them better understand and make decisions.

AI supports essentially the autonomous tasks performed by the AHVs 102 in Mission, System and Subsystem Levels. It empowers the four categories of Autonomy embedded in the central and peripheric control architecture that insure the operativity of the AHVs 102: Situational and Self Awareness, Reasoning and Acting, Collaboration and Interaction, Integrity.

In the preferred embodiment, a hybrid approach it taken. This mean that the system still relies on the presence and supervision of human operators in the loop. In this context establish an organization with hierarchy and determine the data flow if of the upmost importance.

Figure 8:
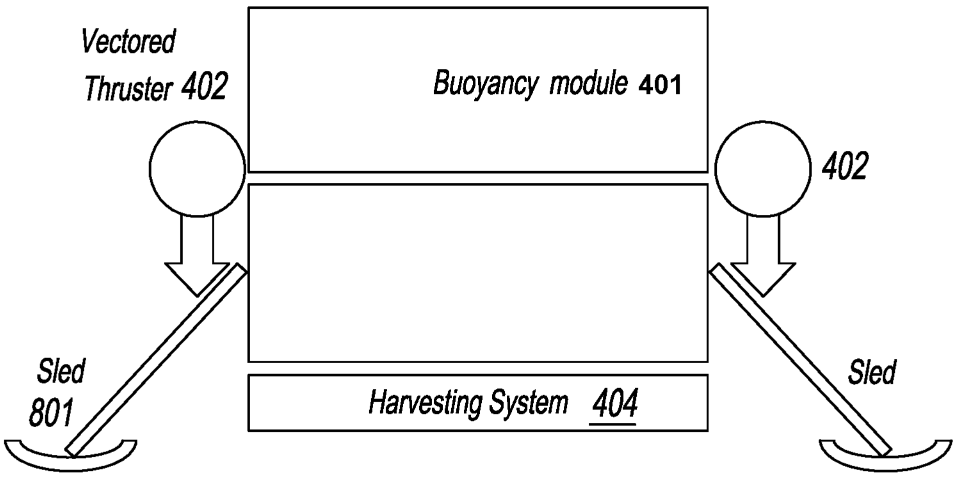
FIG. 8 is a front view of an embodiment of the AHV.

Referring now to FIG. 8, FIG. 8 is a functional diagram of an AHV. As depicted in FIG. 8, vectored thrusters 402 may be attached to the AHV below and to the sides of the buoyancy module 401, so that the AHV's center of gravity will be low enough to avoid overturning. Other heavy components such as sleds 801 or harvesting system 404 will also be disposed below the buoyancy module.

Figure 9:
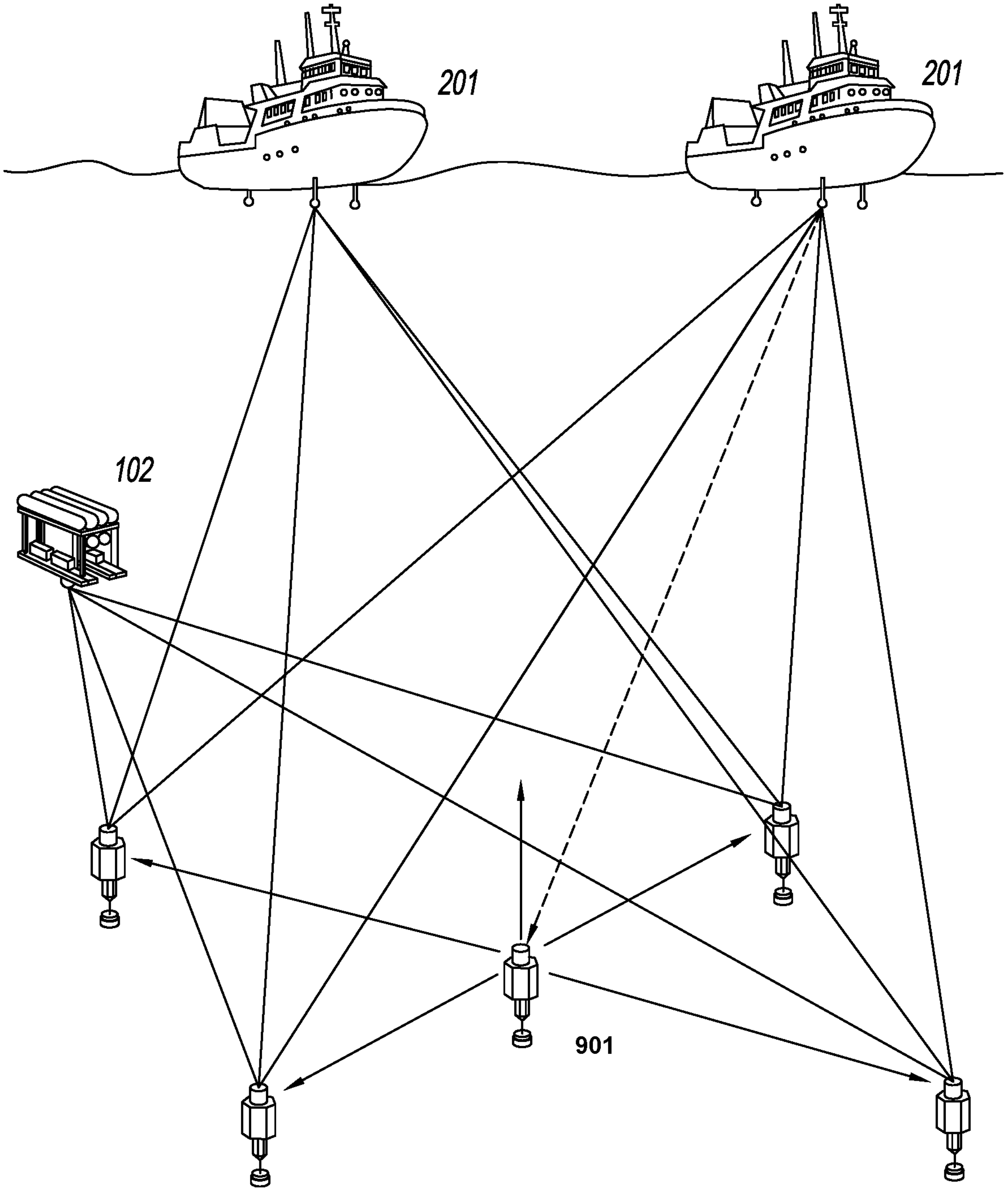
FIG. 9 is a conceptual illustration of an embodiment of the communication network between the underwater and surface components of the invention.

Referring now to FIG. 9, FIG. 9 is a functional schematic of an underwater communications network allowing a drone or AHV 102 to communicate with one or more surface vessels or SDB 201. Communications between an AHV 102 and the SDB 201 may be direct, or they may be routed through one or more underwater repeater nodes 901. Repeater nodes may relay communications with an AHV 102, SDB 201, or another other repeater node 901. The underwater communications network may preferably use existing network protocols such as TCP/IP or UDP for communications, or they may use other communications protocols specifically developed for underwater, high latency, and/or low bandwidth communications. Repeater Nodes 901 may be fastened directly to the seafloor. Alternately, a repeater node 901 may be buoyant yet tethered to the seafloor but allowed to float higher in the water column. Alternately, they may have negative buoyancy and be tethered to the SDB 201 and allowed to sink as far as permitted by the tether.

Referring now to FIG. 10, FIG. 10 is a schematic diagram of the preferred embodiment of the communication and data processing systems of the invention.

As shown, the process is built over two domains: the Underwater Domain (left bubble) and the Surface Domain (right bubble).

The Underwater Domain includes the AHVs 102, AUVs 101, and USHs 104 networks. The Surface Domain is constituted primarily by the MCC in the MSV.

They are connected through the Communication Layers that include the Fiber Optic Link between the USH 104 and the Surface Vessel, the Acoustic Network and the Optical Wireless Network.

A Data Storage Layer ensures that all the raw data and cured data from/to all the underwater and surface sources are secured and stored.

The Underwater Domain is constituted by the AHVs 102, AUVs 101, and USHs 104 networks. As discussed earlier, they have autonomous capabilities for their tasks, so the majority of the computations are performed at local level—Peripheric Control System—The sensors/actuators on the systems (IMU, sonar, altimeters, load cells, etc.) feed the information directly in the peripheric control that elaborates them to determine the relevant autonomous task. For example the best route for the harvesting in the assigned area. Cured information of the task are sent through the Communication Layer to the Surface Domain in the Central Control for monitoring purposes. The information are shown on the COP—Common Operating Picture interface—that allows the Mission Operators to have the main parameters of the operation under control anytime. The Operator through the HMI—Human Machine Interface—can intervene anytime on the operations. From the HMI, Mission Planning and Guidance and Optimization commands flow through the Central Control back to the devices Peripheral Control.

The communication layer guarantee the link between the Surface and Underwater Domains. Cured data need a moderate to low bandwidth, so they are exchanged through the Acoustic Network. The Network is redundant with Hubs on the Vessel (HiPap) and on all the USH 102 connected to surface through a Fiber Optic Link. Raw data require high bandwidth, so they are exchanged though the Optical Network. Optical Network Hubs are located on the USH 102 (and if needed on the UBS 103 and other subsea hubs), from here the data flow through Fiber Optic links to the surface. All the logging and raw data saved into the AHVs 102 are uploaded to the surface when the AHV 102 docks on the USH 104 for battery reloading.

The Storage Layer, part of the Central Control System intercepts and secures all the flowing cured and raw data from Underwater and Surface devices.

In the preferred embodiment, the human operators can monitor the autonomous operations through a COP-type interactive environment. Through the interactive environment they are able to plan the missions, provide guidance and optimization when needed, and control the execution if needed.

In the preferred embodiment, the monitoring by the human operators can be performed using a Common Operating Picture ("COP") tool is a real-time Geospatial Information System ("GIS") to manage the challenges presented by the big amount of data generated during the operations. COP simplifies information by fusing this data to create a 3D presentation that gives immediate in-context information. The main feature of the COP is its ability to simultaneously localize and map incoming information, also video or still image feeds from the AHVs 102 or the AUV 101 or the USH 104 while they operate. These pieces of information are incrementally matched up, and geo-registered resulting in an immediate 3D GIS reconstruction. An example of a COP 3D GIS reconstruction is shown FIG. 13.

In the preferred embodiment, the COP has the following Features:

MAP Database: Access to the map database of the harvesting areas with multiple layers of information.

MAP Layering: Control transparency and layering of the maps to display the most pertinent information at any time.

Area Assignment: Capability to assign harvesting areas to the AHV directly on the map.

Route Planning: Capability to plan/override routes for the AHV directly on the map.

Contingency Planning: Plan and update contingency routes for emergency situations such as loss of link or propulsion.

Notification Center: Highlighted alarms and warning notification so the operator can stay focus on the mission.

Custom Notifications: Interactive controls to allow operators to easily respond to alarms or to display the appropriate emergency procedure.

Vehicle MFD Interface: Multi-Function Display with a familiar aviation interface to monitor and control vehicles for heading, speed, and altitude status. Change the route setting and monitor environmental conditions near the vehicle.

Customizable Navigation Control: Tailor MFD for each vehicle's capabilities and missions, including harvesting parameters, and autonomous modes.

Multi Vehicle Control: The COP gives the Operators the possibility to simultaneously control multiple and different vehicles (AHV, AUV, USH) represented in the 3D map.

Network Centric Control: Monitor, control and handoff a vehicle to any control station or to other operators.

Automated Look Ahead: Notification of the ETA, the remaining power, the planned autonomous trajectories, possible collision routes, so the Operator has time to plan and override where needed.

Map-Centric Displays: Estimated time enroute, distance to waypoint, speed, remaining power, quantity of mineral carried and other status indicators displayed on the map for situational awareness.

Range Boundaries: Visualization of the communication ranges, harvesting areas, environmental sensitive areas.

Restriction Zones: Restriction Zones, for example environmental sensitive areas, can be setup on the map.

Area Awareness: possibility to annotate the map with points, lines, polygons to designate areas and features of interest.

Video Mode: Possibility to overlay videos, pictures, sensor images from any of the vehicles when needed.

Production Layer: Monitoring of the outputs, the quantity of the mineral harvested and the remaining estimated deposit in the specified area. Also with historical data.

In the preferred embodiment, the basic 3D rendering, video and images of the harvesting sites are obtained by the AUVs 102 during the exploration campaign prior of the start of the harvesting phase.

The computing capabilities of the system reside across several devices: Peripheric Control System, and the Mission Control Center, Central Control System.

AHV 102—The AHV 102 peripheric control system includes a computer able to acquire sensors data, elaborate them and determine, based on AI algorithms, the actions of the AHV 102 as explained in the previous sections. The AHV 102 is constantly sending and receiving data within the network to empower the Network Centric Intelligence. The AHV 102 computer stores and saves all the sensors raw data and upload them on the USH 104 during the recharging. As a redundancy a secondary computer system is present on the AHV 102 that in case of emergency is only able to fly the AHV 102 to the closest USH 104, run diagnostic and manage the stored data. When the AHV 102 is docked on the USH 104 or on its proximity connected with the optical link, the operator is able to have full remote access to the computers.

USH 104—The USH 104 acts as a hub for optical and acoustic communications, for recharging and basic maintenance of AHVs 102 and AUVs 101 and for data storage and distribution to Mission Control Center. The USH 104 maintains a fiber optic link to the surface, so its control computers are constantly accessible by the operators. The USH 104 peripheric control system includes a computer dedicated to acquire internal sensors data (sonar, environmental information) and relay them to surface to populate the COP system. A computer dedicated to diagnostic and maintenance of the AHVs 102 AUVs 101 when connected to the USH 104, including battery recharging management. And a redundant computer system that backs-up the surface main control computer. This backup computer is activated in case the main system on the vessel goes down. The computer is accessible by the operators via the fiber optic link.

MCC—The Mission Control Center on the Support Vessel has redundant computers that host the Central Control System. The backup storage system is host in the Vessel to save all the mission data.

Secondary Mission Control Centers—In the event that the Mission Control Center host in the Support Vessel become inoperative, Operators shall move to backup Mission Control Centers to ensure continuity of the operations. A secondary MCC is host in one of the Fast Supply Vessels that can connect via radio link to the USH 104 buoys and through the Fiber Optic Link to the USH 104 backup computers. Another secondary MCC is containerized and can be deployed on any Vessel of Opportunity. It can connect via radio link to the USH 102 buoys and through the Fiber Optic Link to the USH 102 backup computers.

Effective communication is key for the success of the harvesting mission.

Each system constitutes a Communication Network Node that shall be able to connect with the others in any phase of the mission. Onshore Mission Control Center, USHs 104, SDB 201, AHVs 102, AUV 101, and Support Vessel constitute the Nodes of the Communication Network.

Figure 14:
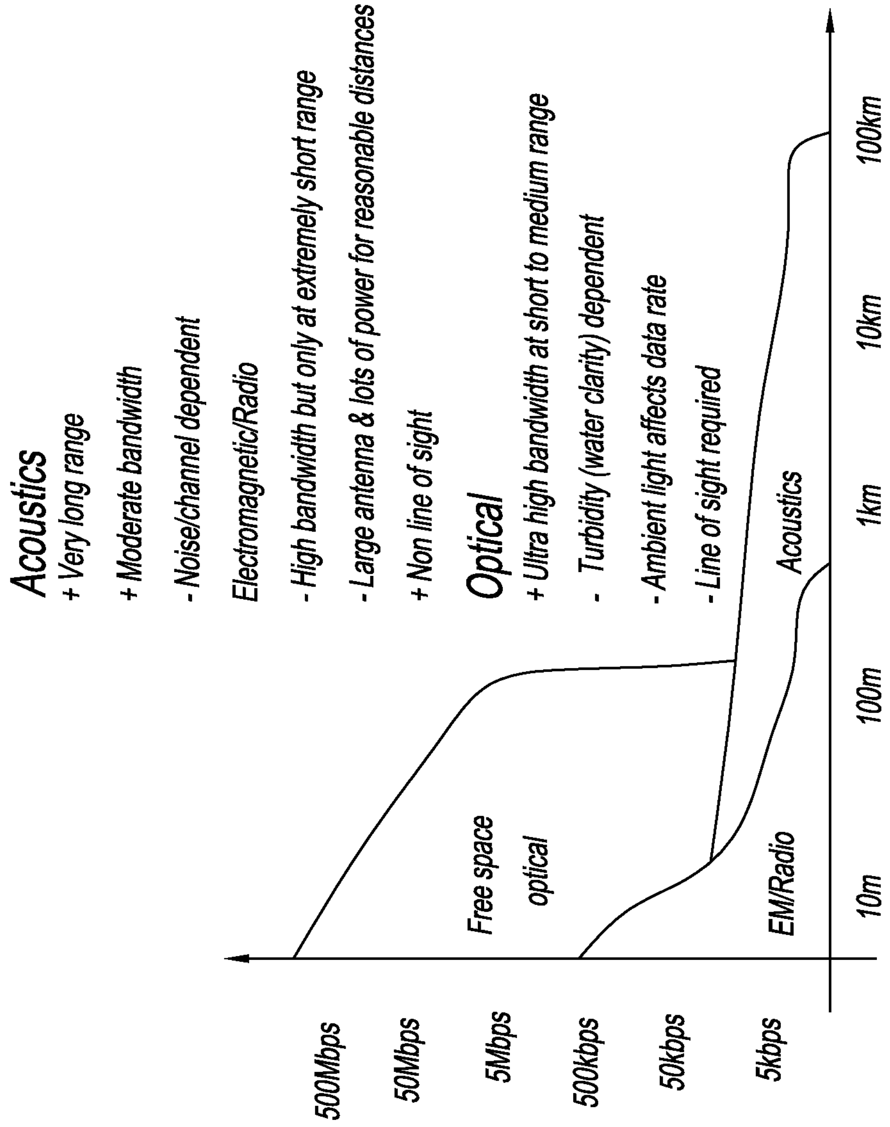
FIG. 14 is a graphic illustration of the features of possible communication domains.

The table shown in FIG. 14 summarizes the communication modality between the nodes.

In developing the wireless network approach for the systems, it is important to ensure that the approach supports the instrumentation required. Such instrumentation will include a range of devices with differing control and output data requirements. This may range from low data rate sensors to high data rate video systems. For this reason, it is necessary to include a wide communication capability.

In addition to the device data requirements, there will be a requirement for short-range wireless communications and longer range communications, for the different mission profiles.

Current technologies available for Subsea communications include Acoustic communication, suitable for great distances but limited on bandwidth and speed, Radio Frequency (RF) and Electro Magnetic Inductive (EM) communication, suitable for very short distances (max 10 m) and limited in bandwidth to 100 kbit/s and the newly emerging Optical wireless or free space optical (FSO) communications. FIG. 14 illustrates the capabilities and uses of each of these technologies.

The subsea wireless network has to provide a lot of access capacity and high-speed communication at acceptable distances.

A combination of Acoustic and Optical, offers an integrated wireless approach that can be beneficial in several applications. The exact composition of a given network depends on the local conditions (application geometry, turbidity, background noise levels, network structures required, available power, etc.) and data requirements.

Acoustic communication is used in missions that are highly automated and require only monitoring and low speed data exchange. An acoustic network will cover all the operation scenario for both communication and positioning. All the systems: SDB 201, Support Vessel, USH 104, AHV 102, AUV 101, are equipped with acoustic modems. Acoustic communications have low to medium data rates and are limited by background noise. Data rates for acoustic communications are limited to thousands of bits per second (bit/s) for ranges of a kilometer and less than a thousand bit/s for ranges up to 100 km (62 mi). Subsea acoustic communications are also affected by temperature gradients and air bubbles in the water. Still, subsea acoustics are efficient at long-range subsea communications and have relatively low power consumption for their range. The ability to communicate over long distances subsea is perhaps acoustic technologies greatest advantage. The speed of acoustic waves in sea water is approximately 1,500 m/s. This means that for long-range communication there is high latency. Latency constitutes problems for applications requiring real-time response, synchronization, and multiple-access protocols.

Underwater acoustic communication is well known in the art. Commercially available options include products from Sonardyne, Aquatec, Teledyne Benthos, Evo Logics, LinkQuest, Nautronix.

Optical wireless or free space optical (FSO) communication in our model is fundamental for missions that require Full Operator Control of the AHV 102.

USH 104 and each AHV 102 are equipped with Optical Modems.

Optical wireless or free space optical (FSO) communications have been used in surface applications for decades. In particular, for point-to-point secure high bandwidth (Gbit/s) links over ranges of up to a few kilometers. These capabilities make FSO fundamental for subsea wireless network applications that require high bandwidth.

For subsea applications, the FSO technology is essentially the same as for surface systems, but the operating wavelengths and ranges are restricted. These are determined by the optical properties of the sea water at the location.

To be effective subsea FSO systems need to operate in the blue-green spectral region. Recent advances in light emitting diode (LED) and laser diode technology have produced efficient, compact, long lifetime optical sources emitting in this range. Similarly, there are a number of efficient optical detectors for these operating wavelengths. In addition to the band widths achievable from LED or laser diode sources, the choice of optical source for a particular application depends on the angular spread, or beam divergence. For high bandwidth point-to-point communications, laser diodes generally are preferable. For lower bandwidth applications involving multiple nodes, the greater angular spread of LEDs may make them preferable.

Other than provide communication, the Laser may power the sensors charging wireless the internal batteries.

Underwater optical communication is well known in the art. Commercially available options include LED-based products from Sonardyne, Aquatec. Laser based communication system are still in the embryonal stage but appears very promising.

Equally important is a Surface Communication Network to guarantee the communication between the SDB 201 and the Support Vessels to exchange data between the subsea systems and the Mission Control Center.

In the preferred embodiment, all the subsea communications will be gathered through the SDBs 201 and transmitted to Mission Control Center through two systems a primary Long Range Radio Broadcast and a Satellite Based System as a backup.

Kongsberg MBR Maritime Broadband Radio features high speed, high capacity digital communication channels.

MBR allows for bi-directional connectivity between assets, with the utilization of IP technology.

Compared to satellite options, the system is dedicated, reliable and cost efficient. MBR exceed 50 km sea level range with broadband connectivity. Data range is between 1 and 15 Mbps.

Satellite based communication systems are well known and used. Standard services guarantee bandwidth up to 3 Mbps and more in special circumstances.

To share in real time basic information to Customers and Management, a cloud-based satellite tracking platform will be adopted.

The platform displays basic data from every asset in the field including navigational maps, operational analytics, and high-level information. The platform is web based and allows a global coverage. Information can be displayed via internet browsers and phone App.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A submersible harvesting vehicle comprising:

A submersible vehicle chassis;

A buoyancy module;

A buoyancy compensation system selected from the group of (a) thruster configured to direct thrust along a range of desired vectors; or (b) variable ballast;

An apron,

A harvesting system for harvesting objects from a surface, said harvesting system selected from a group of:

(a) A Mechanical harvesting system further comprising:

A drum configured to move a reel configured to move teeth to substantially skim a surface containing objects the user desires to retrieve;

The teeth being configured to move the objects onto and along the apron;

(b) A Hydraulic harvesting system further comprising:

A pump configured to generate a vacuum at the inlet to remove the objects to be harvested from the surface and deposit the objects onto and along the apron;

The hydraulic control system further configured to substantially optimize operations and account for environmental and operational effects of displaced surface material;

(c) A picker harvesting system comprising:

A robotic arm connected to the submersible vehicle, the robotic arm comprising a proximal end, one or more bendable joints, a distal end, and a grabber component disposed at the distal end for grabbing objects off the surface;

The apron being configured to retain the objects while allowing other material to return to the surface;

The apron further configured to direct the objects to a container for retaining the objects;

A load sensor to measure a weight and mass of the objects in the container;

An altimeter;

A sled configured to maintain the submersible harvesting vehicle at a substantially constant altitude from the surface;

The submersible harvesting vehicle being configured to adjust the buoyancy compensation system based on input from the load sensor and the altimeter to maintain a desired height above the surface;

A power pack configured to be pressure tolerant;

A control system, the control system comprising:

A control sensor package; and

A control architecture;

The control architecture comprising:

A processor;

A memory storing executable instructions;

A data processing module configured to receive and filter and process data from the control sensor package;

A decision-making module configured to analyze the data from the data processing module and generate task-specific control commands; and An actuation module configured to implement control commands by interfacing with mechanical and electrical components;

The control system being configured to control the vehicle to conduct at least one function selected from the group of: (a) harvesting, (b) navigation, and (c) communications;

wherein, when configured for navigation, the control architecture determines a path based on sensor data and adjusts movement parameters accordingly;

wherein, when configured for harvesting, the control architecture analyzes sensor data related to environmental conditions to optimize object collection via the harvesting system; and wherein, when configured for communication, the control architecture processes signals received by the sensor package and manages data transmission and reception from a remote system;

A navigation system, the navigation system comprising:

A navigation computer; and

A navigation sensor package including at least one sensors selected from the group of: (a) a Inertial Navigation System, (b) a Doppler Velocity Log, (c) a Depth Sensor, (d) the altimeter, and (e) a heading sensor;

The navigation system being configured to combine inertial data with longitudinal and latitudinal data to optimize navigational data;

The navigation system being further configured to receive input from support sensors to provide data for functions selected from the group of (a) obstacle avoidance data and (b) target identification data;

The navigation system being further configured to navigate the submersible harvesting vehicle fully autonomously;

The navigation system being further configured to receive optional commands from an operator for semiautonomous and fully remotely controlled operations;

A communication system configured to transmit and/or receive information with other submerged or surface equipment using at least one communications protocol selected from the group of: (a) acoustic protocols and (b) optical protocols;

Wherein the submersible harvesting vehicle comprises one or more marine-sensors configured to detect and identify marine life, communicate identified marine life data to the operator, avoid disruption to or attempts to collect marine life, and avoid collisions with marine life; and Wherein the submersible harvesting vehicle may be configured to coordinate its movement and harvesting activities with other submersible harvesting vehicles operating in the same geographic area to execute a mission assigned by the operator.

* * * * *